(12) United States Patent
    Furuwata

(10) Patent No.: US 11,350,014 B2
(45) Date of Patent:       May 31, 2022

(54) COMMUNICATION SYSTEM, RECEIVING APPARATUS, AND METHOD FOR SECURE FACSIMILE COMMUNICATION

(71) Applicant: SEIKO EPSON CORPORATION, Tokyo (JP)

(72) Inventor: Yuichi Furuwata, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/205,566

(22) Filed: Mar. 18, 2021

(65) Prior Publication Data

US 2021/0306524 A1    Sep. 30, 2021

(30) Foreign Application Priority Data

Mar. 24, 2020 (JP) .............................. JP2020-052532

(51) Int. Cl.
    *H04N 1/00*  (2006.01)
    *H04N 1/44*  (2006.01)
    *H04N 1/23*  (2006.01)

(52) U.S. Cl.
    CPC .......... *H04N 1/4433* (2013.01); *H04N 1/001* (2013.01); *H04N 1/00119* (2013.01); *H04N 1/00403* (2013.01); *H04N 1/23* (2013.01)

(58) Field of Classification Search
    None
    See application file for complete search history.

(56) References Cited

U.S. PATENT DOCUMENTS

| 10,474,403 | B2* | 11/2019 | Yoshimura | ............ G06F 3/1236 |
| 10,979,595 | B2* | 4/2021 | Rebert | ............... H04N 1/32683 |
| 2009/0187758 | A1* | 7/2009 | Fujii | ..................... G06F 21/608 713/153 |
| 2010/0017493 | A1* | 1/2010 | Codignotto | ............. H04L 51/12 709/206 |
| 2010/0128291 | A1* | 5/2010 | Vendrow | ................. G06F 21/64 358/1.9 |
| 2010/0157347 | A1* | 6/2010 | Yoshimura | ......... H04N 1/00225 358/1.13 |

(Continued)

FOREIGN PATENT DOCUMENTS

JP        2012156583 A      8/2012

*Primary Examiner* — Henok Shiferaw
(74) *Attorney, Agent, or Firm* — Chip Law Group

(57) ABSTRACT

A communication system includes a transmitting apparatus and a receiving apparatus that communicates with the transmitting apparatus over a telephone line. The transmitting apparatus includes a first facsimile transmitting section, a first voice-information transmitting section that transmits first voice information that is voice information on a first user, and a first control section. The receiving apparatus includes a second facsimile receiving section, a second voice-information communication section that receives the first voice information, and a second control section. The second control section permits or rejects reception of the image information from the transmitting apparatus via the second facsimile receiving section based on a result of authentication of the first user performed based on the received first voice information and second voice information on a user who is permitted in advance to use the receiving apparatus.

15 Claims, 14 Drawing Sheets

(56) References Cited

U.S. PATENT DOCUMENTS

| | | | |
|---|---|---|---|
| 2010/0245908 A1* | 9/2010 | Tonegawa | G03G 15/5087 358/1.15 |
| 2010/0328712 A1* | 12/2010 | Ono | H04N 1/00214 358/1.15 |
| 2013/0051541 A1* | 2/2013 | Inoue | H04N 1/33323 379/100.01 |
| 2014/0307294 A1* | 10/2014 | Rebert | H04N 1/001 358/407 |
| 2015/0146232 A1* | 5/2015 | Morita | H04N 1/4433 358/1.14 |
| 2018/0052941 A1* | 2/2018 | Codignotto | G06F 3/1276 |

* cited by examiner

COMMUNICATION SYSTEM, RECEIVING APPARATUS, AND METHOD FOR SECURE FACSIMILE COMMUNICATION

The present application is based on, and claims priority from JP Application Serial Number 2020-052532, filed Mar. 24, 2020, the disclosure of which is hereby incorporated by reference herein in its entirety.

BACKGROUND

1. Technical Field

The present disclosure relates to a communication system, a receiving apparatus, and a method for controlling the communication system.

2. Related Art

Research and development of facsimile communication is being carried out.

In this respect, there is a known communication apparatus that transmits and receives image information by, of the facsimile communication, F-code communication in which the image information contains sub-addresses (see JP-A-2012-156583).

However, the sub-addresses in the F-code communication may be unintentionally revealed to a third party. For this reason, the communication apparatus disclosed in JP-A-2012-156583 may have insufficient confidentiality in transmitting and receiving image information.

SUMMARY

According to a first aspect of the present disclosure, a communication system includes a transmitting apparatus and a receiving apparatus that communicates with the transmitting apparatus over a telephone line. The transmitting apparatus includes a first facsimile transmitting section that transmits image information over the telephone line, a first voice-information transmitting section that transmits first voice information that is voice information on a first user, and a first control section that controls the first facsimile transmitting section and the first voice-information transmitting section. The receiving apparatus includes a second facsimile receiving section that receives the image information over the telephone line, a second voice-information communication section that receives the first voice information, and a second control section that controls the second facsimile receiving section and the second voice-information communication section. When the second voice-information communication section receives the first voice information from the transmitting apparatus, the second control section permits or rejects reception of the image information from the transmitting apparatus via the second facsimile receiving section based on a result of authentication of the first user performed based on the received first voice information and second voice information on a user who is permitted in advance to use the receiving apparatus.

According to a second aspect of the present disclosure, a receiving apparatus that communicates with a transmitting apparatus over a telephone line includes a second facsimile receiving section that receives image information over the telephone line, a second voice-information communication section that receives first voice information that is voice information on a first user, and a second control section that controls the second facsimile receiving section and the second voice-information communication section. When the second voice-information communication section receives the first voice information from the transmitting apparatus, the second control section permits or rejects reception of the image information from the transmitting apparatus via the second facsimile receiving section based on a result of authentication of the first user performed based on the received first voice information and second voice information on a user who is permitted in advance to use the receiving apparatus.

According to a third aspect of the present disclosure, a method for controlling a communication system including a transmitting apparatus and a receiving apparatus that communicates with the transmitting apparatus over a telephone line, wherein the transmitting apparatus includes a first facsimile transmitting section that transmits image information over the telephone line and a first voice-information transmitting section that transmits first voice information that is voice information on a first user, and wherein the receiving apparatus includes a second facsimile receiving section that receives the image information over the telephone line and a second voice-information communication section that receives the first voice information. The method includes a first step of the transmitting apparatus transmitting the first voice information to the receiving apparatus via the first voice-information transmitting section, a second step of the receiving apparatus receiving the first voice information from the transmitting apparatus via the second voice-information communication section, and a third step of the receiving apparatus permitting or rejecting reception of the image information from the transmitting apparatus by the second facsimile receiving section based on a result of authentication of the first user performed based on the first voice information that the receiving apparatus received at the second step and second voice information on a user who is permitted in advance to use the receiving apparatus.

DESCRIPTION OF EXEMPLARY EMBODIMENTS

Embodiment

An embodiment of the present disclosure will be described hereinbelow with reference to the drawings.
Outline of Communication System First, the outline of a communication system according to an embodiment will be described.

The communication system according to the embodiment includes a transmitting apparatus and a receiving apparatus. The receiving apparatus communicates with the transmitting apparatus over telephone lines.

The transmitting apparatus includes a first facsimile transmitting section, a first voice-information transmitting section, and a first control section. The first facsimile transmitting section transmits image information over telephone lines. The first voice-information transmitting section transmits voice information. The first control section controls the first facsimile transmitting section and the first voice-information transmitting section. The first control section transmits first voice information to the receiving apparatus via the first voice-information transmitting section.

The receiving apparatus includes a second facsimile receiving section, a second voice-information communication section, and a second control section. The second facsimile receiving section receives image information over telephone lines. The second voice-information communication section receives voice information. The second control section controls the second facsimile receiving section and the second voice-information communication section. The second control section receives first voice information from the transmitting apparatus via the second voice-information communication section. The second control section permits or rejects reception of image information from the transmitting apparatus via the second facsimile receiving section based on the result of authentication of a first user performed based on the received first voice information and second voice information on a user who is permitted in advance to use the receiving apparatus.

This allows the communication system according to the embodiment to enhance confidentiality in transmitting and receiving image information. The configuration of the communication system and processing performed by the communication system will be individually described in detail.

The transmitting apparatus may be any type of apparatus configured to transmit image information by facsimile communication. In the following example, the transmitting apparatus is a multifunctional machine configured to transmit and receive image information by facsimile communication.

Figure 1:
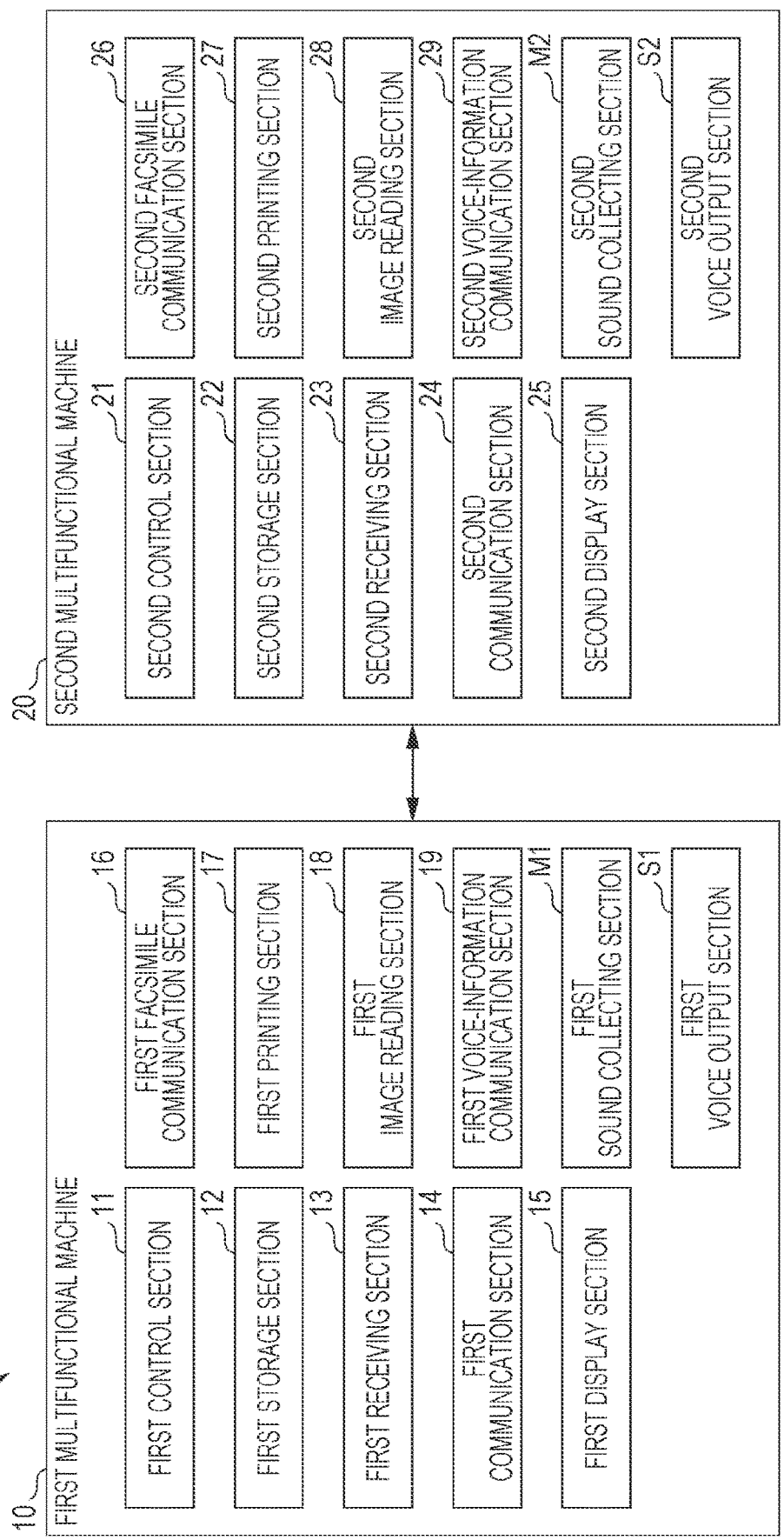
FIG. 1 is a diagram illustrating an example of the configuration of a communication system.

The receiving apparatus may be any type of apparatus that can receive image information by facsimile communication. In the following example, the receiving apparatus is a multifunctional machine configured to transmit and receive image information by facsimile communication.
Configuration of Communication System A communication system 1 shown in FIG. 1 will be described hereinbelow as an example the communication system of the embodiment. FIG. 1 is a diagram illustrating an example of the configuration of the communication system 1.

The communication system 1 includes a first multifunctional machine 10 and a second multifunctional machine 20.

The communication system 1 performs facsimile communication between the first multifunctional machine 10 and the second multifunctional machine 20. In addition to normal facsimile communication, the communication system 1 performs secure facsimile communication in which confidentiality of image information transmitted and received between the first multifunctional machine 10 and the second multifunctional machine 20 is higher than the normal facsimile communication. The normal facsimile communication performed by the communication system 1 is facsimile communication different from the secure facsimile communication described below. In this embodiment, of processing performed by the communication system 1, processing for secure facsimile communication will be described in detail. For this reason, in this embodiment, a description of processing for normal facsimile communication among the processing operations performed by the communication system 1 will be omitted.

For the secure facsimile communication of the communication system 1, authentication based on voice information is performed between the first multifunctional machine 10 and the second multifunctional machine 20. In the communication system 1, when the first multifunctional machine 10 transmits image information to the second multifunctional machine 20 by secure facsimile communication, the second multifunctional machine 20 performs authentication based on voice information transmitted from the first multifunctional machine 10 to the second multifunctional machine 20. In contrast, in the communication system 1, when the second multifunctional machine 20 transmits image information to the first multifunctional machine 10 by secure facsimile communication, the first multifunctional machine 10 performs authentication based on voice information transmitted from the second multifunctional machine 20 to the first multifunctional machine 10. In the communication system 1, one of the first multifunctional machine 10 and the second multifunctional machine 20 may perform authentication based on voice information. In the following example, a first user of the users of the first multifunctional machine 10 transmits image information from the first multifunctional machine 10 to the second multifunctional machine 20 by secure facsimile communication. In this case, in the communication system 1, the second multifunctional machine 20 performs authentication based on voice information transmitted from the first multifunctional machine 10 to the second multifunctional machine 20. The voice information transmitted from the first multifunctional machine 10 to the second multifunctional machine 20 for the authentication in the secure facsimile communication is referred to as first voice information for the convenience of description.

In the communication system 1, when the second multifunctional machine 20 receives the first voice information in secure facsimile communication, the second multifunctional machine 20 determines whether to receive image information from the first multifunctional machine 10 based on the result of authentication of the first user performed based on the received first voice information and second voice information stored in advance. This allows the in the communication system 1 to enhance confidentiality in transmitting and receiving image information.

The communication system 1 may be configured to perform the secure facsimile communication in combination with confidential communication. This allows the communication system 1 to enhance confidentiality in transmitting and receiving image information by confidential communication.

Next, the respective configurations of the first multifunctional machine 10 and the second multifunctional machine 20 will be described.

The first multifunctional machine 10 is a multifunctional machine that perform facsimile communication with the second multifunctional machine 20 in the communication system 1. For this end, the first multifunctional machine 10 has a function for transmitting and receiving image information by facsimile communication. In addition to the function for transmitting and receiving image information by facsimile communication, the first multifunctional machine 10 has a function for transmitting and receiving voice information, a printing function, and an image reading function. The printing function is a function for printing images on a print medium. The image reading function is a function for reading image information indicating an image printed on a print medium from the print medium. The first multifunctional machine 10 is an example of the transmitting apparatus described above.

The first multifunctional machine 10 is communicably connected to the second multifunctional machine 20 over telephone lines. This allows the first multifunctional machine 10 to perform facsimile communication with the second multifunctional machine 20 over telephone lines. The first multifunctional machine 10 can also transmit and receive voice information to and from the second multifunctional machine 20 over telephone lines. In other words, the first multifunctional machine 10 can perform voice communication with the second multifunctional machine 20 over telephone lines.

The first multifunctional machine 10 is communicably connected to the second multifunctional machine 20 over a wireless or wired network. The network may be the Internet, a local area network (LAN), a Wi-Fi®, or another network. This allows the first multifunctional machine 10 to transmit and receive voice information to and from the second multifunctional machine 20 over the network. The first multifunctional machine 10 may be configured not to communicate with the second multifunctional machine 20 over the network.

The first multifunctional machine 10 includes a first control section 11, a first storage section 12, a first receiving section 13, a first communication section 14, a first display section 15, a first facsimile communication section 16, a first printing section 17, a first image reading section 18, a first voice-information communication section 19, a first sound collecting section M1, and a first voice output section S1.

The first control section 11 controls the entire first multifunctional machine 10. An example of the first control section 11 is a central processing unit (CPU). The first control section 11 may be another processor, such as a field programmable gate array (FPGA), as an alternative to the CPU. The first control section 11 performs various processes in the first multifunctional machine 10 by executing various programs stored in the first storage section 12. For example, the first control section 11 performs authentication based on voice information in the secure facsimile communication described above. The first control section 11 may be configured not to perform the authentication.

Examples of the first storage section 12 includes a hard disk drive (HDD), a solid state drive (SSD), an electrically erasable programmable read-only memory (EEPROM), a read-only memory (ROM), and a random access memory (RAM). In other words, the first storage section 12 includes a transitory storage unit and a non-transitory storage unit. The first storage section 12 does not have to be installed in the first multifunctional machine 10 and may be an external storage unit coupled via a digital input/output port, such as a universal serial bus (USB). The first storage section 12 stores various programs, various images, and various items of information that the first control section 11 processes.

Examples of the first receiving section 13 include a keyboard, a mouse, a touchpad, and other input devices. As an alternative, the first receiving section 13 may be a touch panel integral with the first display section 15.

The first communication section 14 includes a digital input/output port for USB or the like, and an Ethernet® port.

Examples of the first display section 15 include a liquid-crystal display panel and an organic electroluminescence (EL) display panel.

The first facsimile communication section 16 performs facsimile communication over telephone lines in response to a request from the first control section 11.

The first printing section 17 is a printer that performs printing on a print medium in response to a request from the first control section 11.

The first image reading section 18 is an image reading unit that reads image information indicating an image printed on a print medium from the print medium in response to a request from the first control section 11.

The first voice-information communication section 19 transmits and receives voice information over the above-described network or telephone lines in response to a request from the first control section 11. The first voice-information communication section 19 is an example of the first voice-information transmitting section. The first voice-information communication section 19 may be configured to transmit voice information over a network or telephone lines but not to receive voice information in response to a request from the first control section 11. In this case, the first multifunctional machine 10 may either include or not include a first voice-information receiving section that receives voice information over a network or telephone lines.

The first sound collecting section M1 is a sound collecting unit, such as a microphone. The first multifunctional machine 10 does not have to include the first sound collecting section M1. In this case, an external first sound collecting section M1 is coupled to the first multifunctional machine 10.

The first voice output section S1 is a unit that outputs voice, such as a speaker. The first multifunctional machine 10 does not have to include the first voice output section S1. In this case, an external first voice output section S1 is coupled to the first multifunctional machine 10.

The second multifunctional machine 20 is a multifunctional machine that performs facsimile communication with the first multifunctional machine 10 in the communication system 1. For this end, the second multifunctional machine 20 has a function for transmitting and receiving image information by facsimile communication. In addition to the function for transmitting and receiving image information by facsimile communication, the second multifunctional machine 20 has a function for transmitting and receiving voice information, a printing function, and an image reading function. The second multifunctional machine 20 is an example of the receiving apparatus described above.

The second multifunctional machine 20 is communicably connected to the first multifunctional machine 10 over telephone lines, as described above. This allows the second multifunctional machine 20 to perform facsimile communication with the first multifunctional machine 10 over telephone lines. The second multifunctional machine 20 can also transmit and receive voice information to and from the first multifunctional machine 10 over telephone lines. In other words, the second multifunctional machine 20 can perform voice communication with the first multifunctional machine 10 over telephone lines.

The second multifunctional machine 20 is communicably connected to the first multifunctional machine 10 via the network described above. The second multifunctional machine 20 may be configured not to communicate with the first multifunctional machine 10 via the network.

The second multifunctional machine 20 includes a second control section 21, a second storage section 22, a second receiving section 23, a second communication section 24, a second display section 25, a second facsimile communication section 26, a second printing section 27, a second image reading section 28, a second voice-information communication section 29, a second sound collecting section M2, and a second voice output section S2.

The second control section 21 controls the entire second multifunctional machine 20. An example of the second control section 21 is a CPU. The second control section 21 may be another processor, such as an FPGA, as an alternative to the CPU. The second control section 21 performs various processes in the second multifunctional machine 20 by executing various programs stored in the second storage section 22.

Examples of the second storage section 22 includes an HDD, an SSD), an EEPROM, a ROM, and a RAM. In other words, the second storage section 22 includes a transitory storage unit and a non-transitory storage unit. The second storage section 22 does not have to be installed in the second multifunctional machine 20 and may be an external storage unit coupled via a digital input/output port, such as a USB. The second storage section 22 stores various programs, various images, and various items of information that the second control section 21 processes.

Examples of the second receiving section 23 include a keyboard, a mouse, a touchpad, and other input devices. As an alternative, the second receiving section 23 may be a touch panel integral with the second display section 25.

The second communication section 24 includes a digital input/output port for USB or the like, and an Ethernet® port.

Examples of the second display section 25 include a liquid-crystal display panel and an EL display panel.

The second facsimile communication section 26 performs facsimile communication over telephone lines in response to a request from the second control section 21.

The second printing section 27 is a printer that performs printing on a print medium in response to a request from the second control section 21.

The second image reading section 28 is an image reading unit that reads image information indicating an image printed on a print medium from the print medium in response to a request from the second control section 21.

The second voice-information communication section 29 transmits and receives voice information over the above-described network or telephone lines in response to a request from the second control section 21. The second voice-information communication section 29 may be configured to receive voice information over a network or telephone lines but not to transmit voice information in response to a request from the second control section 21. In this case, the second multifunctional machine 20 may either include or not include a second voice-information transmitting section that transmits voice information over a network or telephone lines.

The second sound collecting section M2 is a sound collecting unit, such as a microphone. The second multifunctional machine 20 does not have to include the second sound collecting section M2. In this case, an external second sound collecting section M2 is coupled to the second multifunctional machine 20.

The second voice output section S2 is a unit that outputs voice, such as a speaker. The second multifunctional machine 20 does not have to include the second voice output section S2. In this case, an external second voice output section S2 is coupled to the second multifunctional machine 20.

The communication system 1 including the first multifunctional machine 10 and the second multifunctional machine 20 with the above configurations transmits and receives image information by secure facsimile communication between the first multifunctional machine 10 and the second multifunctional machine 20, as described above.

Figure 2:
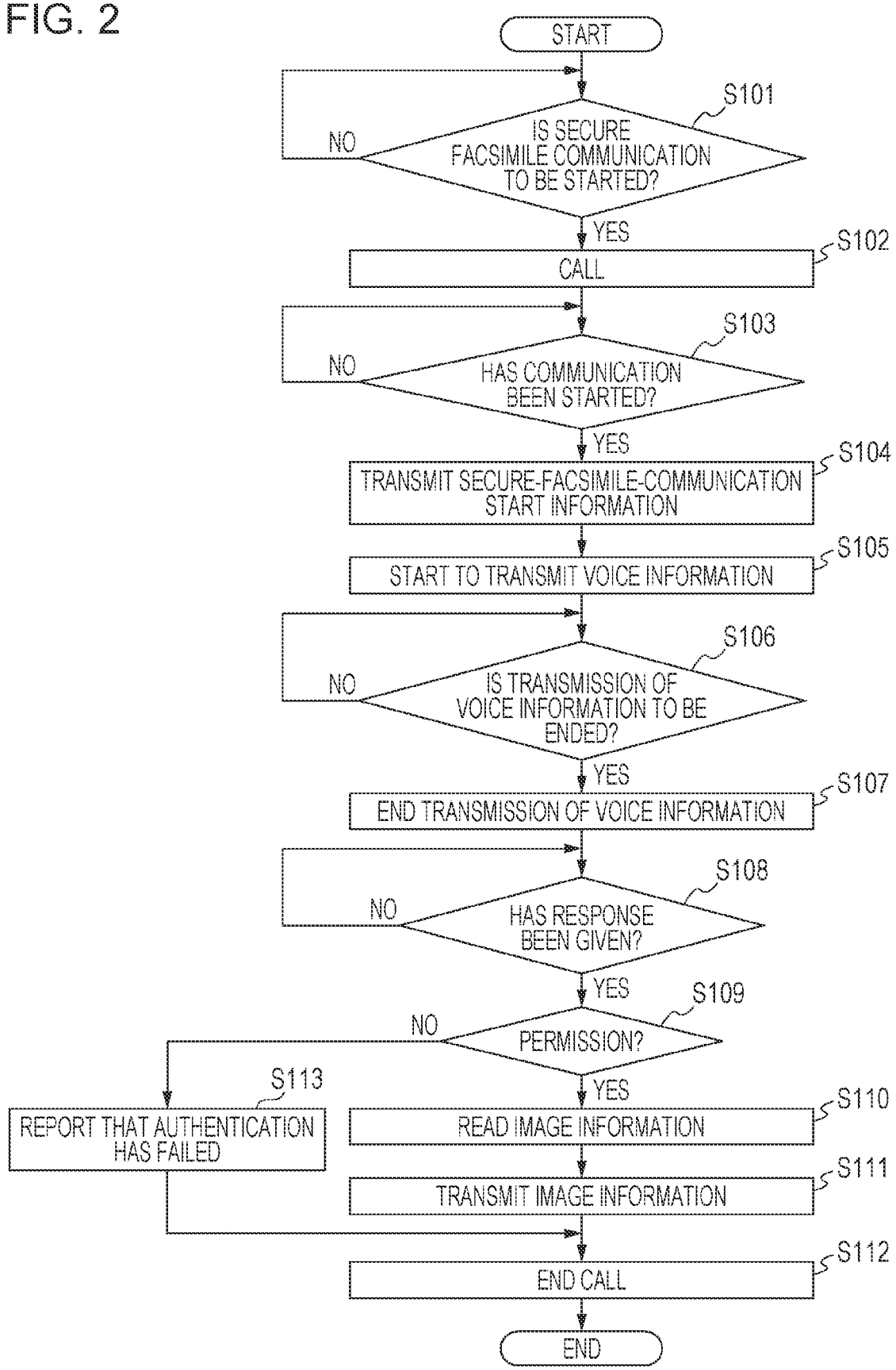
FIG. 2 is a diagram showing an example of the procedure of processing in which a first multifunctional machine transmits image information to a second multifunctional machine by secure facsimile communication.

Processing in which First Multifunctional Machine Transmits Image Information to Second Multifunctional Machine by Secure Facsimile Communication Processing in which the first multifunctional machine 10 transmits image information to the second multifunctional machine 20 by secure facsimile communication will be described. FIG. 2 is a diagram showing an example of the procedure of processing in which the first multifunctional machine 10 transmits image information to the second multifunctional machine 20 by secure facsimile communication. In the following example, the first voice-information communication section 19 transmits voice information to the second multifunctional machine 20 over telephone lines. In this example, a print medium on which a desired image that the first user intends to transmit to the second multifunctional machine 20 is printed is disposed at a position where image information can be read by the first image reading section 18 of the first multifunctional machine 10 before the time the processing of step S101 shown in FIG. 2 is performed. In this example, the secure facsimile communication performed between the first multifunctional machine 10 and the second multifunctional machine 20 is combined with confidential communication. In this case, performing the secure facsimile communication is, in other words, performing confidential communication.

The first control section 11 waits to receive an operation for starting secure facsimile communication via the first receiving section 13 (step S101). The operation may be any operation that triggers the first multifunctional machine 10 to start secure facsimile communication.

If the first control section 11 determines that an operation for starting secure facsimile communication has been given (step S101: YES), then the first control section 11 controls the first voice-information communication section 19 to call the second multifunctional machine 20 (step S102).

Next, the first control section 11 waits for start of communication with the second multifunctional machine 20 over telephone lines (step S103). For example, if the second multifunctional machine 20 accepts the call, the first multifunctional machine 10 determines that the communication is started. If the second multifunctional machine 20 does not accept the call, the first multifunctional machine 10 determines that the communication has not been started.

If the first control section 11 determines that communication with the second multifunctional machine 20 over telephone lines has been started (step S103: YES), then the first control section 11 controls the first facsimile communication section 16 to transmit secure-facsimile-communication start information indicating that secure facsimile communication is to be started to the second multifunctional machine 20 over telephone lines (step S104). This allows the second multifunctional machine 20 to determine that the first multifunctional machine 10 starts secure facsimile communication. The first control section 11 may transmit the secure-facsimile-communication start information to the second multifunctional machine 20 at another timing. The first control section 11 may control the first communication section 14 to transmit the secure-facsimile-communication start information to the second multifunctional machine 20 over the network described above. In this example, performing secure facsimile communication is performing confidential communication, as described above. For this reason, the secure-facsimile-communication start information in this example is also information that indicates starting confidential communication.

Next, the first control section 11 starts to transmit voice information over telephone lines (step S105). More specifically, at step S105, the first control section 11 controls the first voice-information communication section 19 to start to transmit voice information indicating a voice picked up by the first sound collecting section M1 over telephone lines. This allows the first user to transmit voice information indicating the voice of the first user to the second multifunctional machine 20 as first voice information by speaking to the first sound collecting section M1 until the transmission of the voice information started by the processing of step S105 ends. The voice indicated by the voice information transmitted to the second multifunctional machine 20 as the first voice information may be a voice indicating a predetermined phrase or any voice. The voice indicated by the voice information transmitted to the second multifunctional machine 20 as the first voice information may be another sound, such as the voice of another user, the voice of an animal other than humans, or machine sound, instead of the voice of the first user.

Next, the first control section 11 waits to receive an operation for ending the transmission of the voice information started at step S105 via the first receiving section 13 (step S106). The operation may be any operation that triggers the first multifunctional machine 10 to end the transmission of the voice information. The processing of step S106 may be processing in which the first control section 11 waits until a predetermined voice collecting time passes. In other words, the processing of step S106 is processing in which the first control section 11 waits until conditions for ending the transmission of the voice information started at step S105 are satisfied.

If the first control section 11 receives the operation for ending the transmission of the voice information started at step S105 (step S106: YES), the first control section 11 ends the transmission of the voice information (step S107). For example, at step S107, the first control section 11 ends the transmission of the voice information over telephone lines by stopping the sound collection of the first sound collecting section M1.

In the secure facsimile communication, authentication of the first user is performed based on the first voice information transmitted from the first multifunctional machine 10 to the second multifunctional machine 20 in the period in which the processing from step S105 to step S107 is performed. The second multifunctional machine 20 determines whether to permit to receive the image information from the first multifunctional machine 10 by facsimile communication. The second multifunctional machine 20 transmits permission information indicating permission of reception of the image information or rejection information indicating rejection of reception of the image information to the first multifunctional machine 10 in response to the first voice information transmitted from the first control section 11 to the second multifunctional machine 20.

After the processing of step S107, the first control section 11 waits to receive permission information or rejection information from the second multifunctional machine 20 in response to the first voice information transmitted to the second multifunctional machine 20 (step S108).

If the first control section 11 determines that permission information or rejection information has been given from the second multifunctional machine 20 (step S108: YES), then the first control section 11 determines whether the information received as a response is permission information (step S109).

If the first control section 11 determines that permission information has been given (step S109: YES), then the first control section 11 controls the first image reading section 18 to read the image information indicating an image printed on the print medium, described above (step S110).

Next, the first control section 11 controls the first facsimile communication section 16 to transmit the image information read at step S110 to the second multifunctional machine 20 by facsimile communication (step S111).

Next, the first control section 11 ends the call (step S112) to end the processing of the flowchart shown in FIG. 2.

In contrast, if the first control section 11 determines that rejection information has been given (step S109: NO), then the first control section 11 reports that the authentication of the first user has failed via the first display section 15 or the like (step S113), and thereafter goes to step S112 to end the call.

Thus, in the communication system 1, the first multifunctional machine 10 transmits image information to the second multifunctional machine 20 by secure facsimile communication. This allows the communication system 1 to enhance confidentiality in transmitting and receiving image information.

Figure 3:
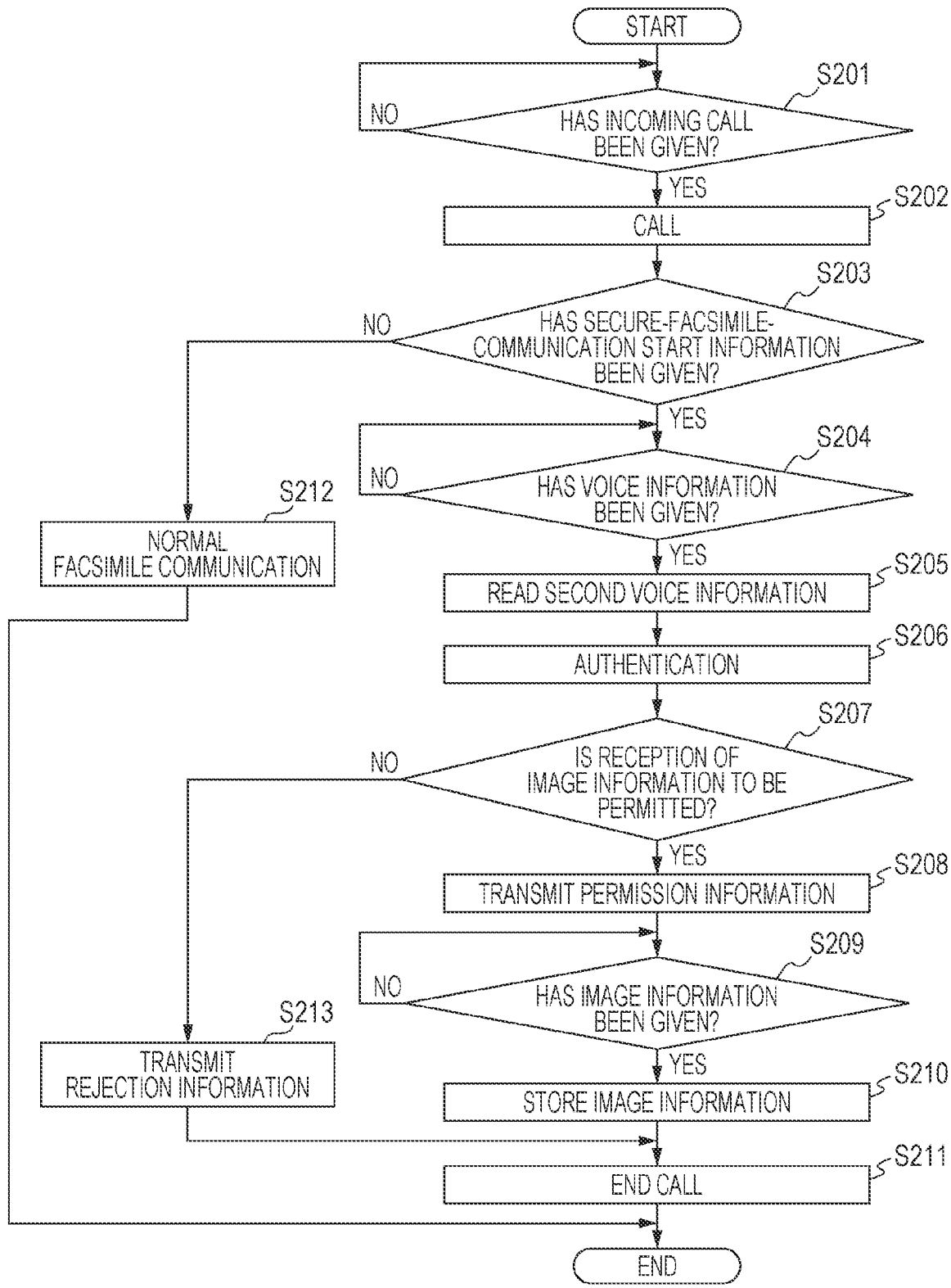
FIG. 3 is a diagram showing an example of the procedure of processing in which the second multifunctional machine receives image information from the first multifunctional machine by secure facsimile communication.

Processing in which Second Multifunctional Machine Receives Image Information from First Multifunctional Machine by Secure Facsimile Communication Processing in which the second multifunctional machine 20 receives image information from the first multifunctional machine 10 by secure facsimile communication will be described hereinbelow. FIG. 3 is a diagram showing an example of the procedure of processing in which the second multifunctional machine 20 receives image information from the first multifunctional machine 10 by secure facsimile communication. In the following example, the second voice-information communication section 29 receives voice information from the first multifunctional machine 10 over telephone lines. In this example, the second voice information described above is stored in the second storage section 22 before the processing of step S201 shown in FIG. 3 is performed. The details of the second voice information will be described later. In this example, the secure facsimile communication performed between the first multifunctional machine 10 and the second multifunctional machine 20 is combined with confidential communication.

The second control section 21 waits to receive an incoming call over telephone lines (step S201).

If the second control section 21 determines that an incoming call over telephone lines has been given (step S201: YES), then the second control section 21 accepts the call (step S202).

Next, the second control section 21 waits for a predetermined waiting time. An example of the predetermined waiting time is two seconds. The predetermined waiting time may be either shorter than or longer than two seconds. If the second control section 21 determines that the predetermined waiting time has passed, then the second control section 21 determines whether secure-facsimile-communication start information has been given while waiting for the predetermined waiting time (step S203).

If the second control section 21 determines that secure-facsimile-communication start information has not been given (step S203: NO), the second control section 21 performs normal facsimile communication (step S212) and ends the processing of the flowchart shown in FIG. 3. The processing of step S212 may be known processing or undeveloped processing.

In contrast, if the second control section 21 determines that secure-facsimile-communication start information has been given (step S203: YES), the second control section 21 waits to receive voice information (step S204).

If the second control section 21 determines that voice information has been given (step S204: YES), then the second control section 21 reads second voice information that is stored in the second storage section 22 in advance from the second storage section 22 (step S205). An example in which the voice information that the second control section 21 received at step S204 is the first voice information transmitted from the first multifunctional machine 10 will be described.

Next, the second control section 21 performs authentication of the first user based on the first voice information received at step S204 and the second voice information read from the second storage section 22 at step S205 (step S206). The processing of step S206 will be described.

The second voice information is voice information indicating the voice of a user who is permitted in advance to use the second multifunctional machine 20. In other words, the authentication of the first user performed at step S206 is authentication for determining whether the first user who is going to transmit image information from the first multifunctional machine 10 to the second multifunctional machine 20 by secure facsimile communication is a user who is permitted in advance to use the second multifunctional machine 20. In step S206, for example, the second control section 21 extracts the voiceprint of the voice indicated by the first voice information based on the first voice information. The second control section 21 extracts the voiceprint of the voice indicated by the second voice information based on the second voice information. The second control section 21 calculates the matching degree of the two extracted voiceprints. If the calculated matching degree is equal to or higher than a predetermined threshold, the second control section 21 determines that the authentication of the first user has succeeded. In contrast, if the calculated matching degree is less than the predetermined threshold, then the second control section 21 determines that the authentication of the first user has failed. Thus, the second control section 21 may perform authentication of the first user based on the two voiceprints. A method for extracting the voiceprints of the voices performed by the second control section 21 may be a known method or an undeveloped method. The second voice information may include voiceprint information indicating the voiceprint of the first user. In this case, the second control section 21 does not extract the voiceprint based on the second voice information. The second control section 21 may perform at least one of such voiceprint extraction and calculation of the matching degree of the voiceprints using a machine learning model.

In step S206, for example, the second control section 21 may specify a phrase based on a voice that the first voice information indicates. In this case, the second control section 21 specifies a phrase based on a voice that the second voice information indicates. The second control section 21 calculates the matching degree of the two specified phrases. If the calculated matching degree is a predetermined threshold or higher, the second control section 21 determines that the authentication of the first user has succeeded. In contrast, if the calculated matching degree is less than the predetermined threshold, the second control section 21 determines that the authentication of the first user has failed. Thus, the second control section 21 may perform phrase authentication based on the two phrases as the authentication of the first user. In this case, the second voice information is voice information according to a voice indicating a predetermined phrase. A method by which the second control section 21 specifies a phrase that a voice indicates may be a known method or an undeveloped method.

In step S206, for example, the second control section 21 may perform authentication in which the voiceprint authentication and the phrase authentication are combined. A method in which the voiceprint authentication and the phrase authentication are combined may be a known method or an undeveloped method.

After the processing of step S206 has been performed, the second control section 21 determines whether to permit the second facsimile communication section 26 to receive the image information from the first multifunctional machine 10 according to the result of authentication at step S206, (step S207). If at step S206 the second control section 21 determines that the authentication of the first user has succeeded, the second control section 21 determines to permit the second facsimile communication section 26 to receive the image information from the first multifunctional machine 10. In contrast, if at step S206 the second control section 21 determines that authentication of the first user has failed, the second control section 21 determines to reject reception of the image information from the first multifunctional machine 10 via the second facsimile communication section 26.

If the second control section 21 determines to reject reception of the image information from the first multifunctional machine 10 via the second facsimile communication section 26 (step S207: NO), the second control section 21 controls the second communication section 24 to transmit the rejection information to the first multifunctional machine 10 (step S213). Then, the second control section 21 ends the call (step S211) to end the processing of the flowchart shown in FIG. 3.

In contrast, if the second control section 21 determines to permit reception of the image information from the first multifunctional machine 10 via the second facsimile communication section 26 (step S207: YES), the second control section 21 controls the second communication section 24 to transmit the permission information to the first multifunctional machine 10 (step S208).

Next, the second control section 21 waits to receive the image information from the first multifunctional machine 10 (step S209).

If the second control section 21 determines that the image information has been given from the first multifunctional machine 10 (step S209: YES), the second control section 21 stores the image information received from the first multifunctional machine 10 in the second storage section 22 (step S210). In this example, since the secure facsimile communication is combined with the confidential communication, the image information received by the second control section 21 is stored in the second storage section 22 at step S210. However, in the case where the secure facsimile communication is not combined with the confidential communication, at step S210, the second control section 21 controls the second printing section 27 to print an image that the received image information indicates on a print medium. At step S210, the second control section 21 may store the image information received from the first multifunctional machine 10 in a storage section different from the second storage section 22.

Next, the second control section 21 moves to step S211 and ends the call to end the processing of the flowchart shown in FIG. 3.

Thus, in the communication system 1, the second multifunctional machine 20 receives image information from the first multifunctional machine 10 by secure facsimile communication. This allows the communication system 1 to enhance confidentiality in transmitting and receiving image information.

Figure 4:
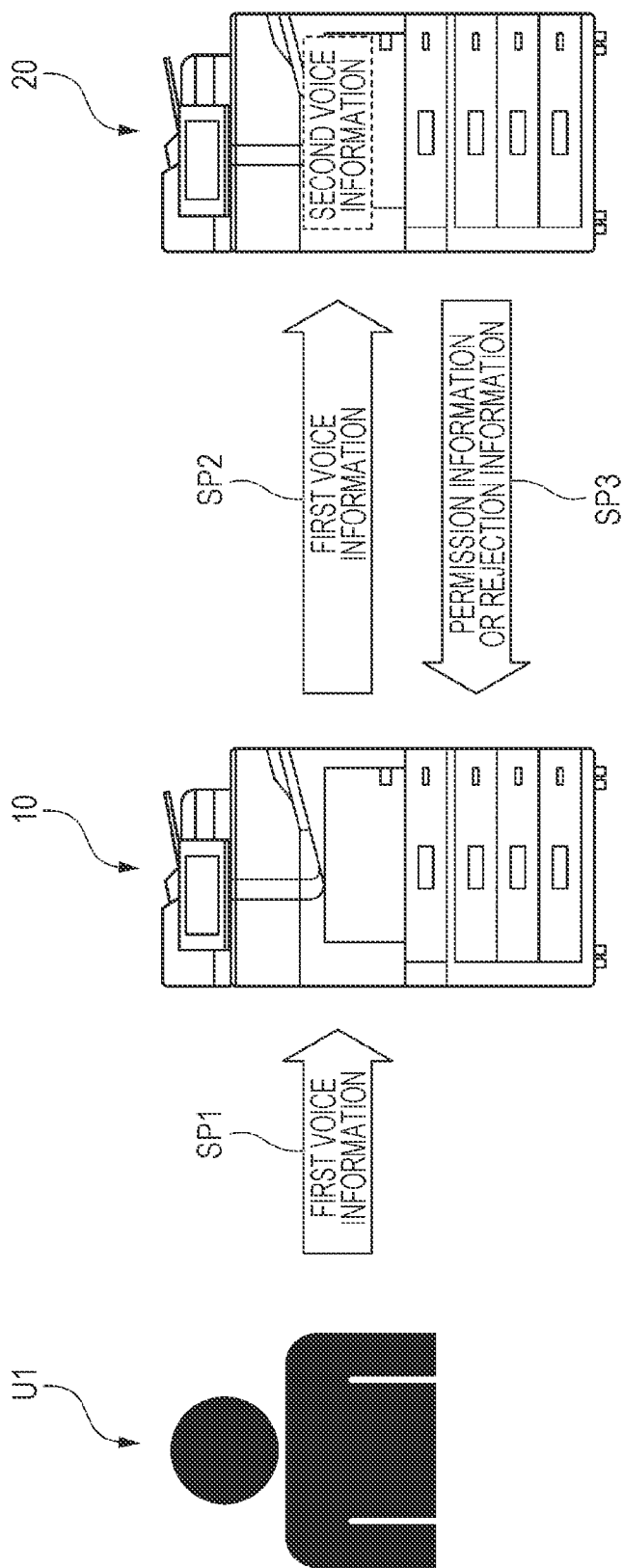
FIG. 4 is a diagram visually showing an example of the procedure of the secure facsimile communication in the communication system.

FIG. 4 is a diagram visually showing an example of the procedure of the secure facsimile communication in the communication system 1. A user U1 shown in FIG. 4 is an example of the first user. As shown in FIG. 4, for secure facsimile communication with the second multifunctional machine 20, the first multifunctional machine 10 receives the first voice information from the user U1, as indicated by arrow SP1. The first multifunctional machine 10 transmits the received first voice information to the second multifunctional machine 20, as indicated by arrow SP2. The second multifunctional machine 20 receives the first voice information transmitted from the first multifunctional machine 10. The second multifunctional machine 20 stores the second voice information in advance, as shown in FIG. 4. The second multifunctional machine 20 therefore performs authentication of the user U1 based on the received first voice information and the stored second voice information. Thereafter, the second multifunctional machine 20 determines whether to permit reception of image information from the first multifunctional machine 10 according to the result of authentication of the user U1. The second multifunctional machine 20 transmits permission information or rejection information to the first multifunctional machine 10 according to the determination result. When the first multifunctional machine 10 receives permission information, the first multifunctional machine 10 transmits the image information to the second multifunctional machine 20. When the first multifunctional machine 10 receives rejection information, the multifunctional machine 10 does not transmit the image information to the second multifunctional machine 20. The communication system 1 performs secure facsimile communication between the first multifunctional machine 10 and the second multifunctional machine 20 in this manner.

Figure 5:
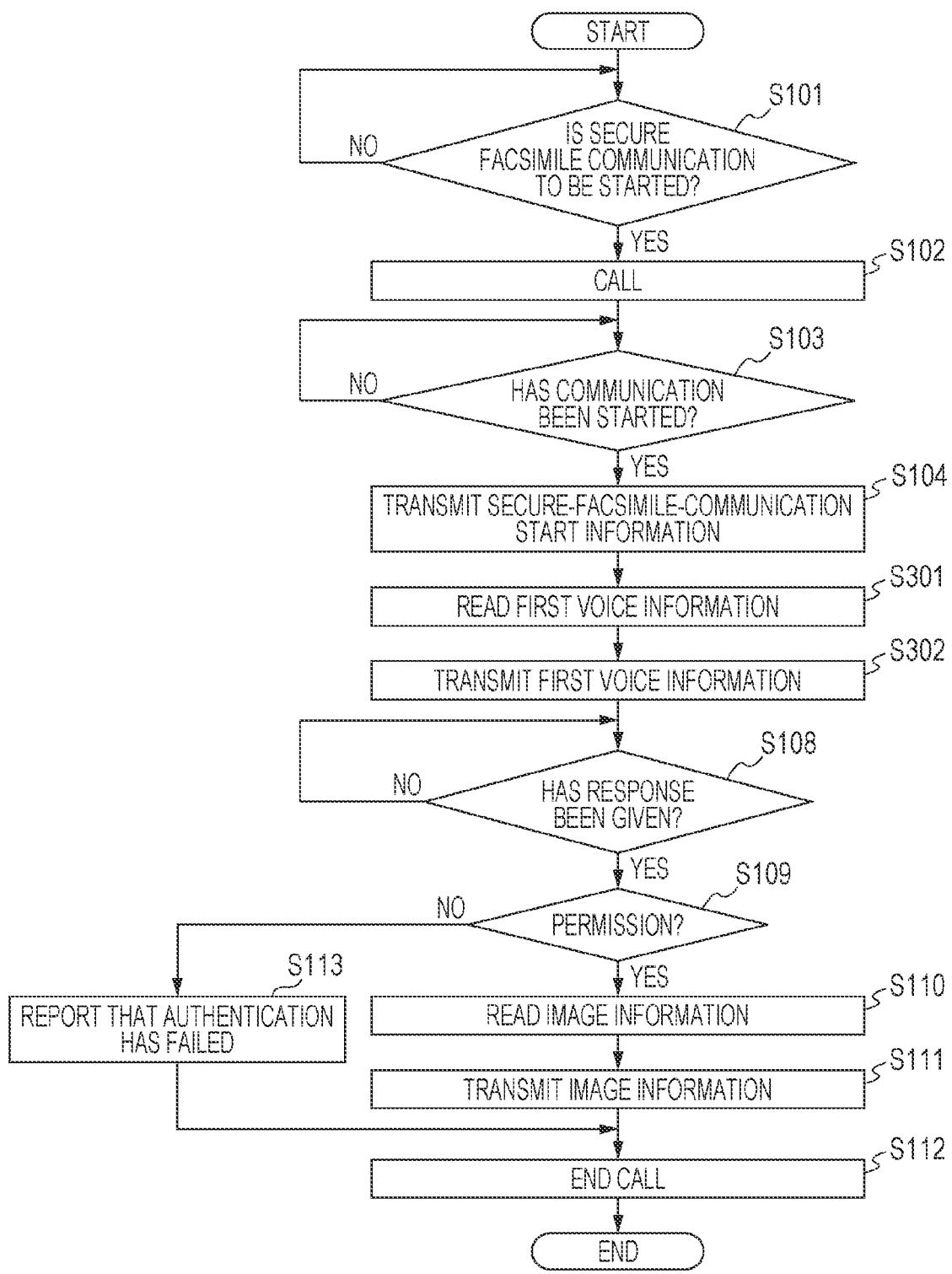
FIG. 5 is a diagram showing another example of the procedure of the processing in which the first multifunctional machine transmits image information to the second multifunctional machine by secure facsimile communication.

Modification of Processing in which First Multifunctional Machine Transmits Image Information to Second Multifunctional Machine by Secure Facsimile Communication A modification of the processing in which the first multifunctional machine 10 transmits image information to the second multifunctional machine 20 by secure facsimile communication will be described hereinbelow. FIG. 5 is a diagram showing another example of the procedure of the processing in which the first multifunctional machine 10 transmits image information to the second multifunctional machine 20 by secure facsimile communication. In the following example, the first voice-information communication section 19 transmits voice information to the second multifunctional machine 20 over telephone lines. In this example, a print medium on which a desired image that the first user intends to transmit to the second multifunctional machine 20 is printed is disposed at a position where image information can be read by the first image reading section 18 of the first multifunctional machine 10 before the processing of step S101 shown in FIG. 5 is performed. In this example, the secure facsimile communication performed between the first multifunctional machine 10 and the second multifunctional machine 20 is combined with confidential communication. In this case, performing secure facsimile communication is, in other words, performing confidential communication. The processing from step S101 to step S104 shown in FIG. 5 is the same as the processing from step S101 to step S104 in FIG. 2. For this reason, a description of the processing from step S101 to step S104 shown in FIG. 5 will be omitted. The processing from step S108 to step S113 shown in FIG. 5 is the same as the processing from step S108 to step S113 shown in FIG. 2. For this reason, a description of the processing from step S108 to step S113 shown in FIG. 5 will be omitted. In the following example, the first voice information is stored in advance in the first storage section 12. The first control section 11 stores the first voice information in the first storage section 12 according to a received operation. The operation may be any operation capable of storing the first voice information in the first storage section 12.

After the processing of step S104 shown in FIG. 5 is performed, the first control section 11 reads the first voice information stored in the first storage section 12 from the first storage section 12 (step S301). In this case, the first voice information is digital data, not analog data. A method for storing the first voice information in the first storage section 12 may be a known method, such as a method for storing the first voice information from another apparatus or a method for collecting sound with a device of the first multifunctional machine 10 capable of collecting sound, or an undeveloped method. Example of the other device include an information processing apparatus, such as a notebook personal computer (PC), or a storage unit, such as a flash memory.

Next, the first control section 11 controls the first voice-information communication section 19 to transmit the first voice information read at step S301 to the first multifunctional machine 10 via the network described above (step S302). The reason why the network is used is because the first voice information is digital data. At step S302, the first control section 11 may control the first voice-information communication section 19 to transmit the first voice information over telephone lines. In this case, the first control section 11 converts the first voice information which is digital data to analog data and then transmits the analog data to the second multifunctional machine 20 over telephone lines.

Thus, in the communication system 1, the first multifunctional machine 10 can perform secure facsimile communication with the second multifunctional machine 20 also by transmitting the stored first voice information to the second multifunctional machine 20. In other words, this also allows the communication system 1 to enhance the confidentiality in transmitting and receiving image information.

Figure 6:
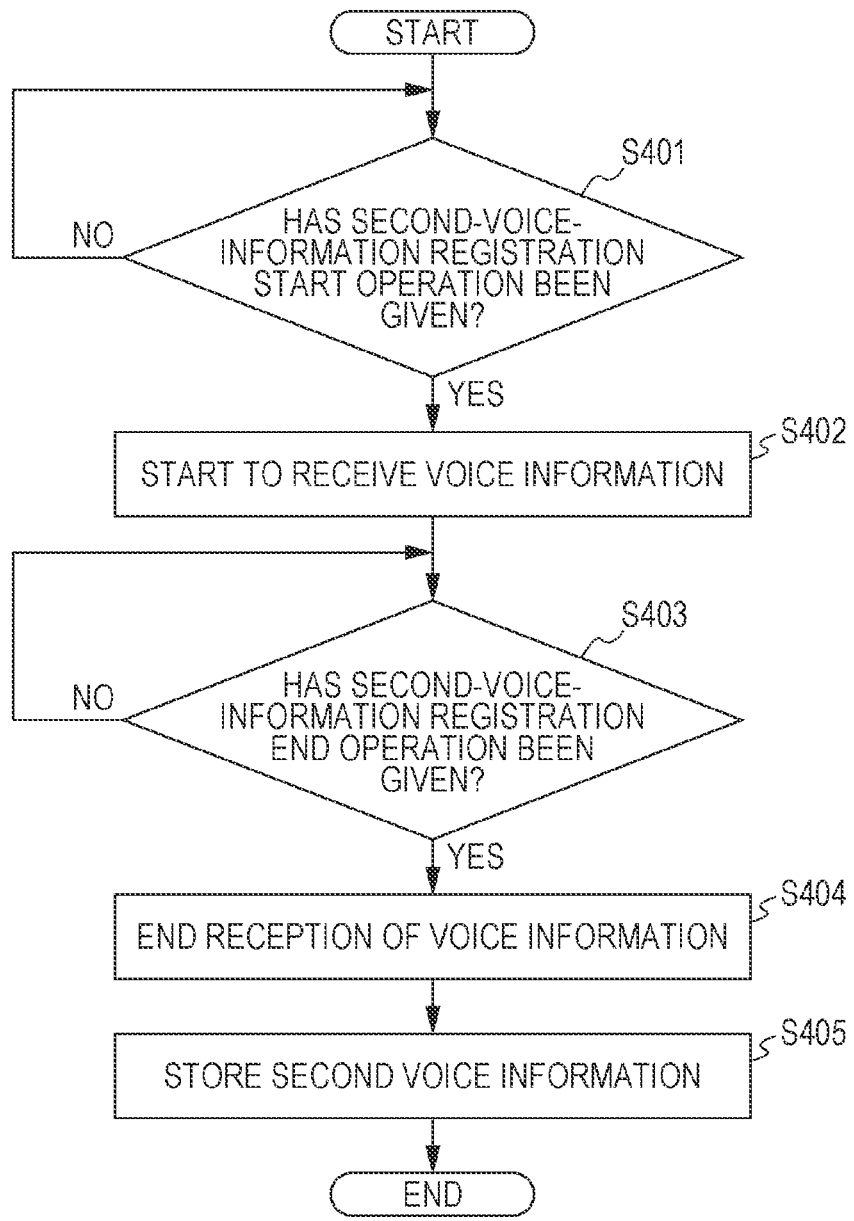
FIG. 6 is a diagram showing an example of the procedure of processing in which the second multifunctional machine stores second voice information.

Processing in which Second Multifunctional Machine Stores Second Voice Information Processing in which the second multifunctional machine 20 stores the second voice information will be described hereinbelow. FIG. 6 is a diagram showing an example of the procedure of processing in which the second multifunctional machine 20 stores the second voice information. In the following example, the user who operates the second multifunctional machine 20 is a second user. In the following example, voice communication between the first multifunctional machine 10 and the second multifunctional machine 20 is started before the processing of step S401 shown in FIG. 6 is performed. This allows the first user to ask the second user to perform a second-voice-information registration start operation via voice communication. The second-voice-information registration start operation may be any operation that triggers the second multifunctional machine 20 to start processing for storing the second voice information.

The second control section 21 waits to receive the second-voice-information registration start operation (step S401).

The second control section 21 controls the second voice-information communication section 29, and if it is determined that the second-voice-information registration start operation has been received (step S401: YES), the second control section 21 starts to receive voice information over telephone lines (step S402). In other words, at step S402, the second control section 21 starts to record the voice information transmitted from the first multifunctional machine 10 to the second multifunctional machine 20 via telephone lines.

Next, the second control section 21 continues the reception of the voice information started at step S402 until a second-voice-information registration end operation is given (step S403). The second-voice-information registration end operation may be any operation that triggers the second multifunctional machine 20 to end the processing in which the second multifunctional machine stores the second voice information.

If the second control section 21 determines that the second-voice-information registration end operation has been given (step S403: YES), the second control section 21 ends the reception of the voice information started at step S402 (step S404).

Next, the second control section 21 stores the voice information received in the processing from step S402 to step S404 in the second storage section 22 as the second voice information (step S405) and ends the processing of the flowchart shown in FIG. 6. The processing of step S405 may be performed in parallel with the processing from step S402 to step S404.

Thus, the second multifunctional machine 20 can store the voice information received from the first multifunctional machine 10 via voice communication in the second storage section 22 as the second voice information. This allows the first user to easily register the second voice information with the second multifunctional machine 20.

Figure 7:
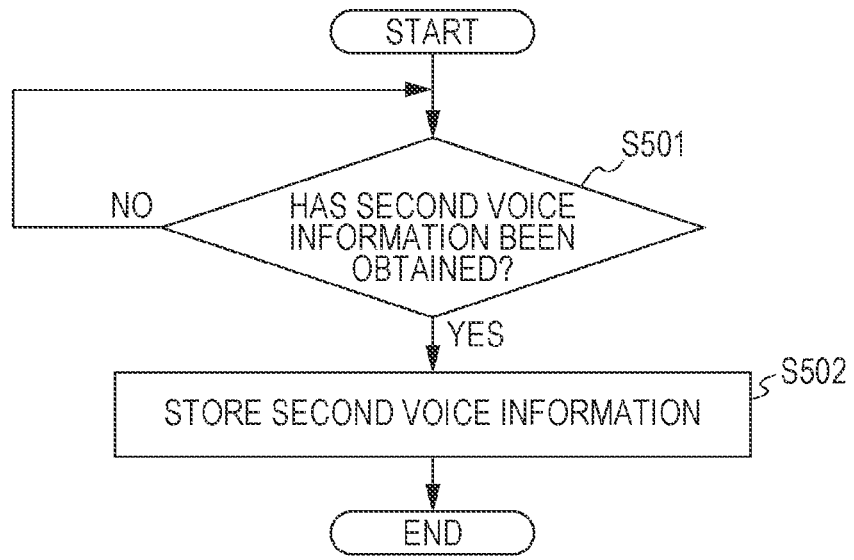
FIG. 7 is a diagram showing another example of the procedure of the processing in which the second multifunctional machine stores the second voice information.

Modification of Processing in which Second Multifunctional Machine Stores Second Voice Information A modification of the processing in which the second multifunctional machine 20 stores the second voice information will be described hereinbelow. FIG. 7 is a diagram showing another example of the procedure of the processing in which the second multifunctional machine 20 stores the second voice information. In the following example, the user who operates the second multifunctional machine 20 is a second user.

The second control section 21 waits to obtain the second voice information (step S501). The second voice information here is digital data, not analog data. At step S501, the second control section 21 may wait to obtain the second voice information by receiving the second voice information from the first multifunctional machine 10 over the network described above, by receiving the second voice information from the first multifunctional machine 10 over telephone lines, or by receiving the second voice information transferred from another device connected to the second multifunctional machine 20. In other words, at step S501, the second control section 21 waits to obtain the second voice information using any method for obtaining the second voice information. However, in the method for obtaining the second voice information by receiving the second voice information from the first multifunctional machine 10 over a network or telephone lines, the second voice information includes a command serving as a trigger to store the second voice information in the second storage section 22.

If the second control section 21 determines that the second voice information has been obtained (step S501: YES), the second control section 21 stores the second voice information in the second storage section 22 (step S502) and ends the processing of the flowchart shown in FIG. 7.

Thus, the second multifunctional machine 20 can store the second voice information in the second storage section 22 even not via voice communication.

Figure 8:
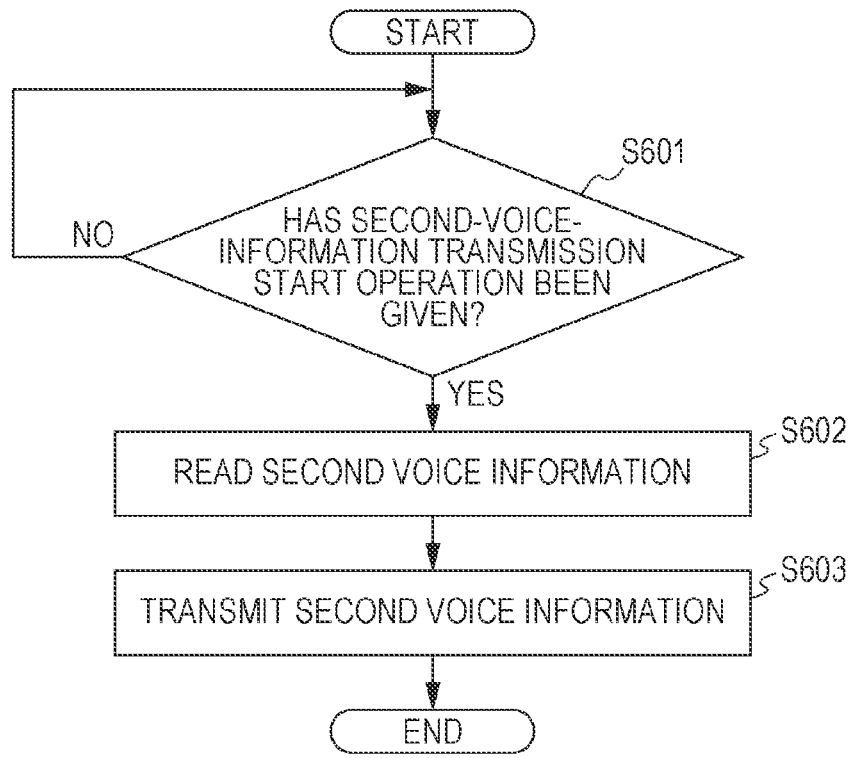
FIG. 8 is a diagram showing an example of processing in which the first multifunctional machine transmits the second voice information to the second multifunctional machine.

In the method for obtaining the second voice information from the first multifunctional machine 10 over a network or telephone lines, the first multifunctional machine 10 transmits the second voice information to the second multifunctional machine 20 by performing the processing of the flowchart shown in FIG. 8. FIG. 8 is a diagram showing an example of processing in which the first multifunctional machine 10 transmits the second voice information to the second multifunctional machine 20. In the following example, the second voice information is stored in the first storage section 12 before the processing of step S601 shown in FIG. 8 is performed.

The first control section 11 waits to receive a second-voice-information transmission start operation (step S601). The second-voice-information transmission start operation may be any operation that triggers the first multifunctional machine 10 to start the processing for transmitting the second voice information to the second multifunctional machine 20.

If the first control section 11 determines that the first control section 11 has received the second-voice-information transmission start operation (step S601: YES), the first control section 11 reads the second voice information stored in advance in the first storage section 12 from the first storage section 12 (step S602).

Next, the first control section 11 controls the first voice-information communication section 19 to transmit the second voice information read at step S602 to the second multifunctional machine 20 over a network or telephone lines (step S603) and ends the processing of the flowchart shown in FIG. 8. In this regard, when transmitting the second voice information to the second multifunctional machine 20 over telephone lines, the first control section 11 also performs processing for starting voice communication with the second multifunctional machine 20, such as a call to the second multifunctional machine 20, at step S603. The first control section 11 includes, in the second voice information, a command for causing the second multifunctional machine 20 to start the processing for storing the second voice information before transmitting the second voice information at step S603.

Thus, the first multifunctional machine 10 transmits the second voice information stored in the first storage section 12 to the second multifunctional machine 20 via a network or telephone lines. Thus, the first multifunctional machine 10 can easily store the second voice information in the second multifunctional machine 20.

Figure 9:
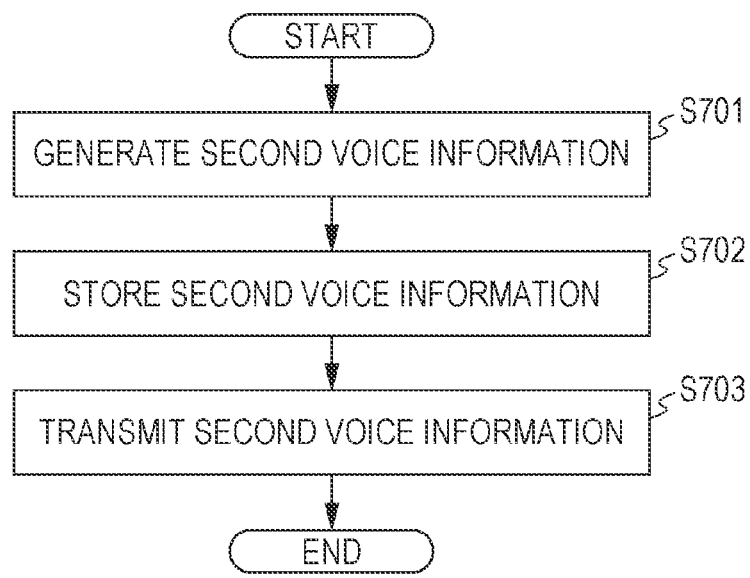
FIG. 9 is a diagram showing an example of the procedure of processing in which the second multifunctional machine generates the second voice information during a second preparatory period.

Processing in which Second Multifunctional Machine 20 Generates Second Voice Information Every Time Secure Facsimile Communication is Started The second voice information described above may be generated every time the second multifunctional machine 20 starts secure facsimile communication. In this case, the second voice information is voice information according to a voice indicating a predetermined phrase. In this case, the second voice information may be voice information according to a voice indicating a phrase that differs every time it is generated or voice information according to a voice indicating the same phrase every time it is generated. The second voice information according to a voice indicating a phrase that differs every time it is generated is voice information according to a one-time pass-phrase. For example, the second multifunctional machine 20 generates second voice information by performing the processing of the flowchart shown in FIG. 9 during the period after determining that the secure-facsimile-communication start information has been given at step S203 shown in FIG. 3 until the processing of step S204 is started. The period is hereinafter referred to as a second preparatory period for the convenience of description. FIG. 9 is a diagram showing an example of the procedure of processing in which the second multifunctional machine 20 generates the second voice information during the second preparatory period.

The second control section 21 generates the second voice information (step S701). For example, the second control section 21 selects one of a predetermined plurality of phrases at random and generates voice information corresponding to a voice indicating the selected phrase as the second voice information. A method by which the second control section 21 generates the second voice information at step S701 may be another method.

Next, the second control section 21 stores the second voice information generated at step S701 in the second storage section 22 (step S702).

Next, the second control section 21 controls the second voice-information communication section 29 to transmit the second voice information generated at step S701 to the first multifunctional machine 10 over telephone lines (step S703) and ends the processing of the flowchart shown in FIG. 9. Note that the second control section 21 converts the second voice information from digital data to analog data and transmits the second voice information converted to the analog data to the first multifunctional machine 10 over telephone lines at step S703.

Thus, the second multifunctional machine 20 allows the first multifunctional machine 10 to output a voice indicating a one-time pass-phrase. As a result, the communication system 1 can further enhance the confidentiality in transmitting and receiving image information.

Figure 10:
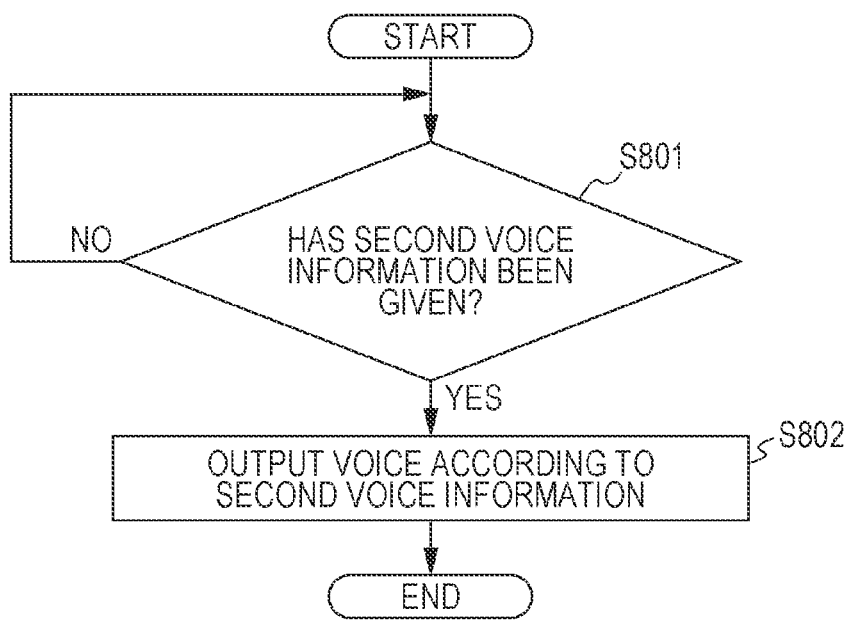
FIG. 10 is a diagram showing an example of the procedure of processing in which the first multifunctional machine receives the second voice information, or a onetime pass-phrase, from the second multifunctional machine during a first preparatory period.

FIG. 10 is a diagram showing an example of the procedure of processing in which the first multifunctional machine 10 receives the second voice information, or the one-time pass-phrase, from the second multifunctional machine 20 during a first preparatory period. The first preparatory period is a period after the secure-facsimile-communication start information is transmitted at step S104 in FIG. 2 until the processing of step S105 is started.

The first control section 11 waits to receive the second voice information from the second multifunctional machine 20 over telephone lines (step S801).

If the first control section 11 determines that the second voice information has been given from the second multifunctional machine 20 over telephone lines (step S801: YES), the first control section 11 outputs a voice according to the received second voice information (step S802) and ends the processing of the flowchart shown in FIG. 10. This allows the first user to hear the phrase that the voice corresponding to the second voice information transmitted from the second multifunctional machine 20 as a one-time pass-phrase.

Figure 11:
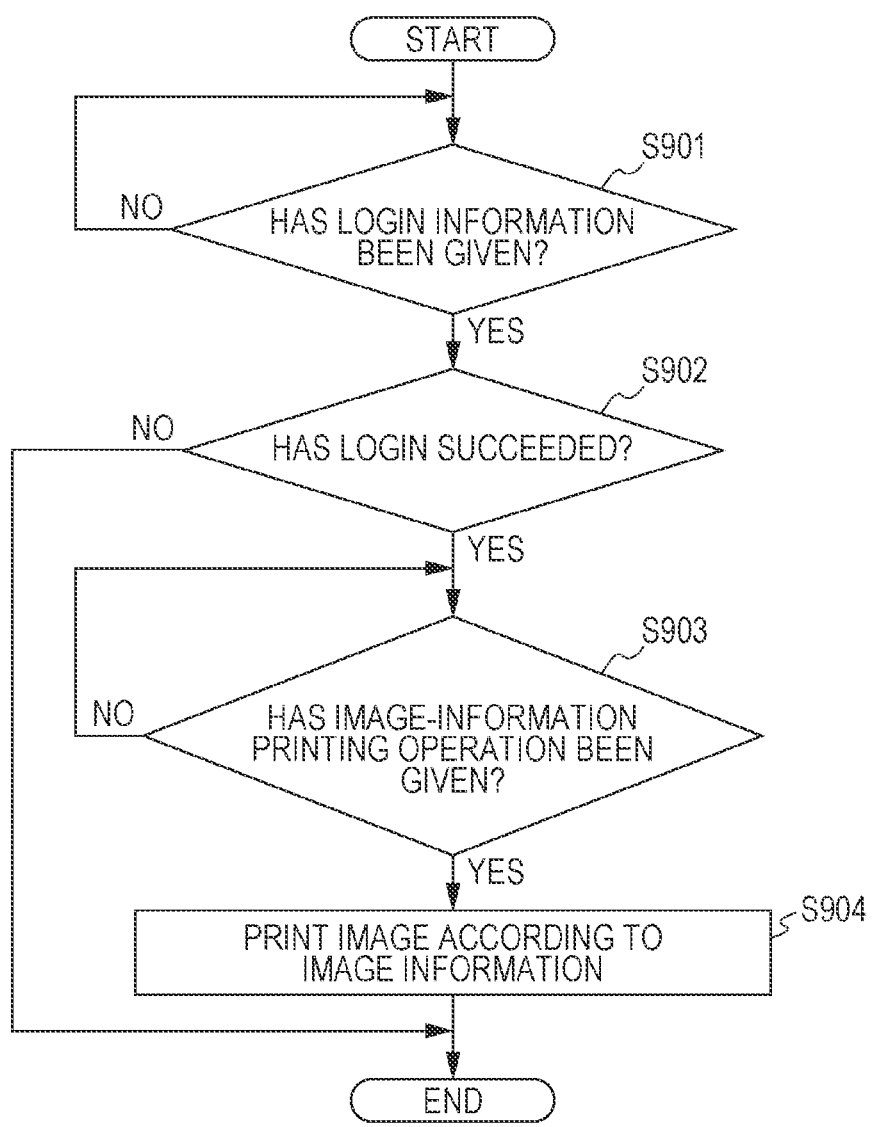
FIG. 11 is a diagram showing an example of the procedure of processing in which the second multifunctional machine prints image information stored in the second multifunctional machine by secure facsimile communication combined with confidential communication.

Processing in which Second Multifunctional Machine Prints Image Information Stored in Second Multifunctional Machine by Secure Facsimile Communication Combined with Confidential Communication Processing in which the second multifunctional machine 20 prints image information stored in the second multifunctional machine 20 by secure facsimile communication combined with confidential communication will be described. FIG. 11 is a diagram showing an example of the procedure of processing in which the second multifunctional machine 20 prints image information stored in the second multifunctional machine 20 by secure facsimile communication combined with confidential communication. The following is an example in which the user of the second multifunctional machine 20 is the second user described above. In the following example, the second multifunctional machine 20 stores image information received by secure facsimile communication combined with confidential communication in the second storage section 22 at a time before the processing of step S901 shown in FIG. 11 is performed. In the following example, the image information is referred to as print-target image information for the convenience of description. In the following example, a login image is displayed on the second display section 25 at that time. The login image is an image for the second multifunctional machine 20 to receive login information from the second user. The login information is information that is necessary for the second user to log in the second multifunctional machine 20.

The second control section 21 waits to receive login information via the login image displayed in advance on the second display section 25 (step S901).

If the second control section 21 determines that the second control section 21 has received login information (step S901: YES), the second control section 21 performs authentication according to the received login information. A method by which the second control section 21 performs authentication according to the login information may be a known method or an undeveloped method. The second control section 21 determines whether the user login has succeeded as the result of this authentication (step S902).

If the second control section 21 determines that the user login has failed (step S902: NO), the second control section 21 displays information indicating that the user login has failed on the second display section 25 and ends the processing of the flowchart shown in FIG. 11.

In contrast, if the second control section 21 determines that the user login has succeeded (step S902: YES), the second control section 21 waits to receive an operation for printing the print-target image information (step S903). The print-target-image-information printing operation may be any operation that triggers the second multifunctional machine 20 to start processing for printing an image that the print-target image information stored in the second storage section 22 indicates on a print medium.

If the second control section 21 determines that the second control section 21 has received the print-target-image-information printing operation (step S903: YES), the second control section 21 controls the second printing section 27 to print an image that the print-target image information stored in the second storage section 22 indicates on a print medium (step S904). After the processing of step S904 is performed, the second control section 21 ends the processing of the flowchart shown in FIG. 11.

Thus, when the second user has succeeded in logging in the second multifunctional machine 20, the second multifunctional machine 20 prints an image that the print-target image information indicates on a print medium according to an operation from the second user. This allows the second multifunctional machine 20 to prevent the image information received by secure facsimile communication combined with confidential communication from being printed by an unintended user.

Modification 1 of Embodiment

Figure 12:
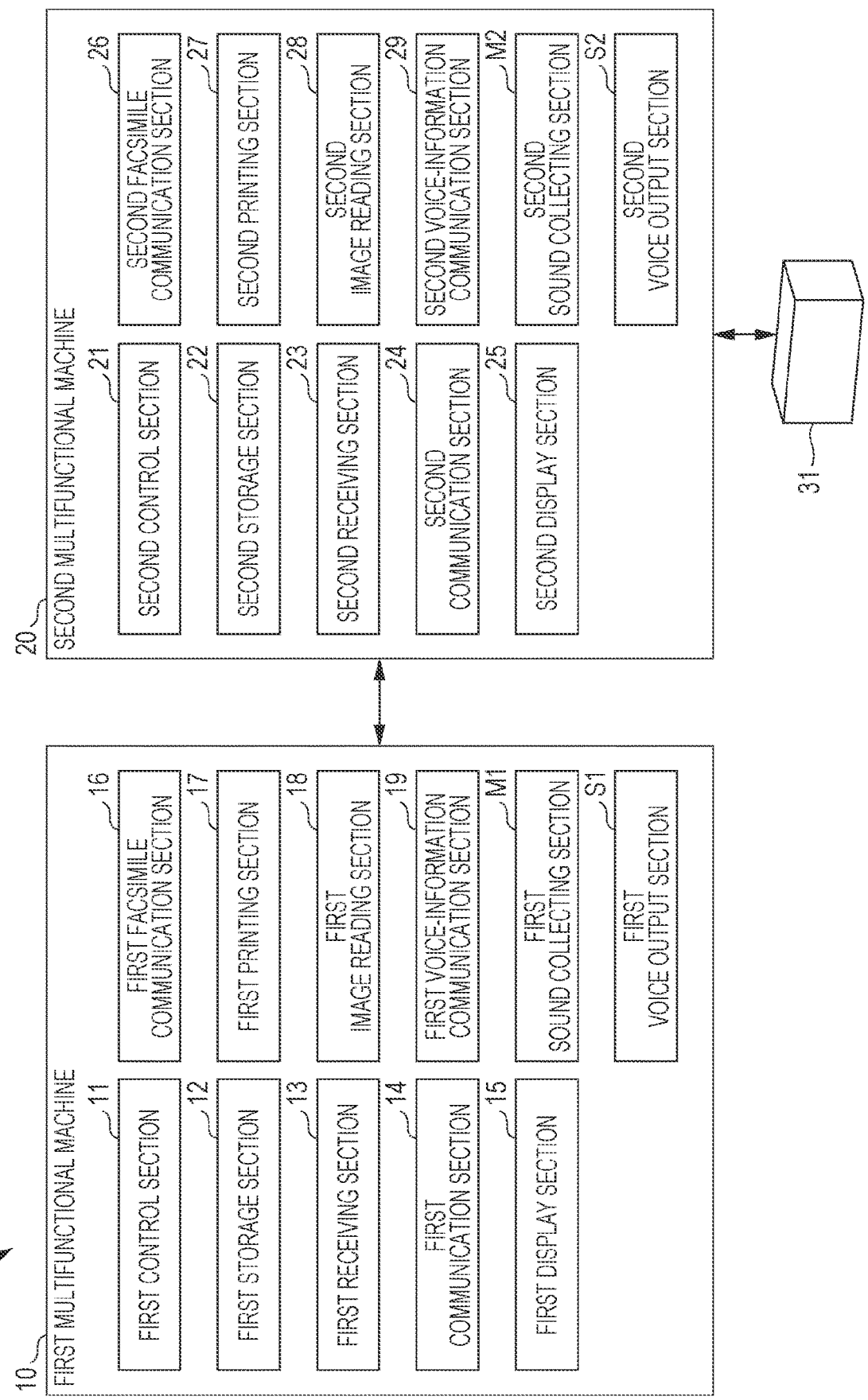
FIG. 12 is a diagram showing an example of the configuration of a communication system according to Modification 1 of the embodiment.

Modification 1 of the embodiment will be described hereinbelow. In a communication system 1 according to Modification 1 of the embodiment, the second control section 21 of the second multifunctional machine 20 does not perform authentication of the first user based on the first voice information and the second voice information. In this communication system 1, the authentication is performed by a first server 31. In other words, the communication system 1 includes the first server 31 that performs the authentication, as shown in FIG. 12. FIG. 12 is a diagram showing an example of the configuration of the communication system 1 according to Modification 1 of the embodiment.

The first server 31 is communicably connected to the second multifunctional machine 20 via wireless or wired communication. The first server 31 is an information processing device, such as a work station, a desktop PC, or a notebook PC. The first server 31 may be another information processing device.

Figure 13:
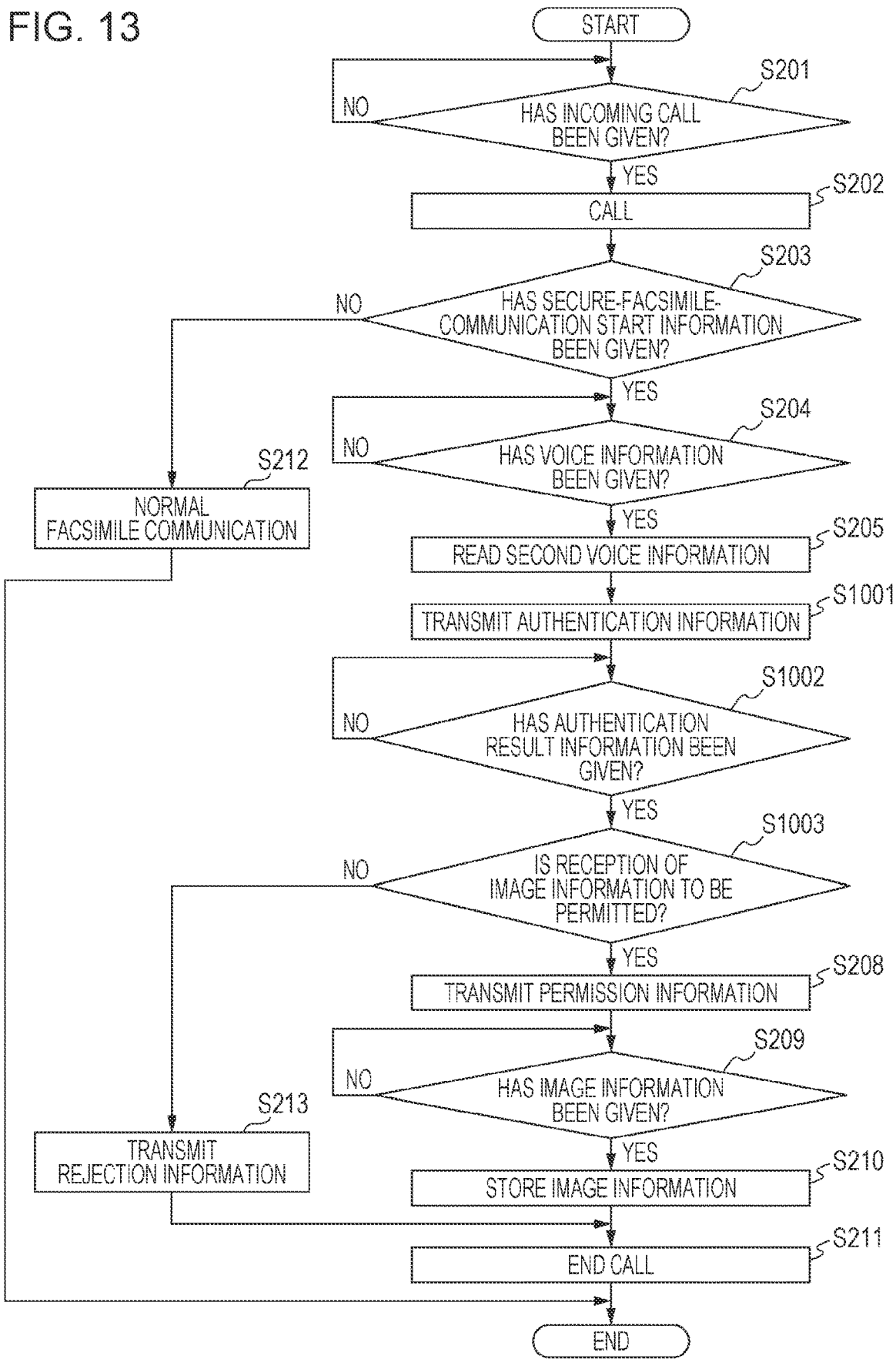
FIG. 13 is a diagram showing another example of the procedure of the processing in which the second multifunctional machine receives image information from the first multifunctional machine by secure facsimile communication.

In the communication system 1 according to Modification 1 of the embodiment, the second multifunctional machine 20 performs the processing of the flowchart shown in FIG. 13. FIG. 13 is a diagram showing another example of the procedure of the processing in which the second multifunctional machine 20 receives image information from the first multifunctional machine 10 by secure facsimile communication. In the following example, the second voice-information communication section 29 receives voice information from the first multifunctional machine 10 over telephone lines. In the following example, the second voice information described above is stored in the second storage section 22 before the processing of step S201 shown in FIG. 13 is performed. In the following example, the secure facsimile communication performed between the first multifunctional machine 10 and the second multifunctional machine 20 is combined with confidential communication. Since the processing from step S201 to step S205 shown in FIG. 13 is the same as the processing from step S201 to step S205 shown in FIG. 3, the description thereof will be omitted. Furthermore, since the processing from step S208 to step S213 shown in FIG. 13 is the same as the processing from step S208 to step S213 shown in FIG. 3, the description thereof will be omitted.

After the processing of step S205 shown in FIG. 13 is performed, the second control section 21 transmits information including the first voice information received at step S204 and the second voice information read at step S205 to the first server 31 as authentication information (step S1001). The first server 31 receives the authentication information and performs the same processing as the processing of step S206 shown in FIG. 3 based on the received authentication information. For this reason, a description of processing in which the first server 31 performs authentication will be omitted.

Next, the second control section 21 waits to receive authentication result information from the first server 31 as a response to the authentication information transmitted at step S1001 (step S1002). The authentication result information is information indicating the result of the authentication performed by the first server 31.

If the second control section 21 determines that authentication result information has been given from the first server 31 (step S1002: YES), then the second control section 21 determines whether to permit reception of the image information from the first multifunctional machine 10 via the second facsimile communication section 26 based on the authentication result information (step S1003). If the result that the authentication result information received at step S1002 indicates is a success, the second control section 21 determines to permit reception of the image information from the first multifunctional machine 10 via the second facsimile communication section 26. In contrast, if the result that the authentication result information received at step S1002 indicates is a failure, the second control section 21 determines to reject reception of the image information from the first multifunctional machine 10 via the second facsimile communication section 26.

If the second control section 21 determines to permit reception of the image information from the first multifunctional machine 10 via the second facsimile communication section 26 (step S1003: YES), the processing moves to step S208 shown in FIG. 13.

In contrast, if the second control section 21 rejects reception of the image information from the first multifunctional machine 10 via the second facsimile communication section 26 (step S1003: NO), the processing goes to step S213 shown in FIG. 13.

Thus, even if authentication of the first user based on the first voice information and the second voice information is performed by the first server 31, instead of the second multifunctional machine 20, the communication system 1 according to Modification 1 of the embodiment can enhance the confidentiality in transmitting and receiving image information.

Modification 2 of Embodiment

Figure 14:
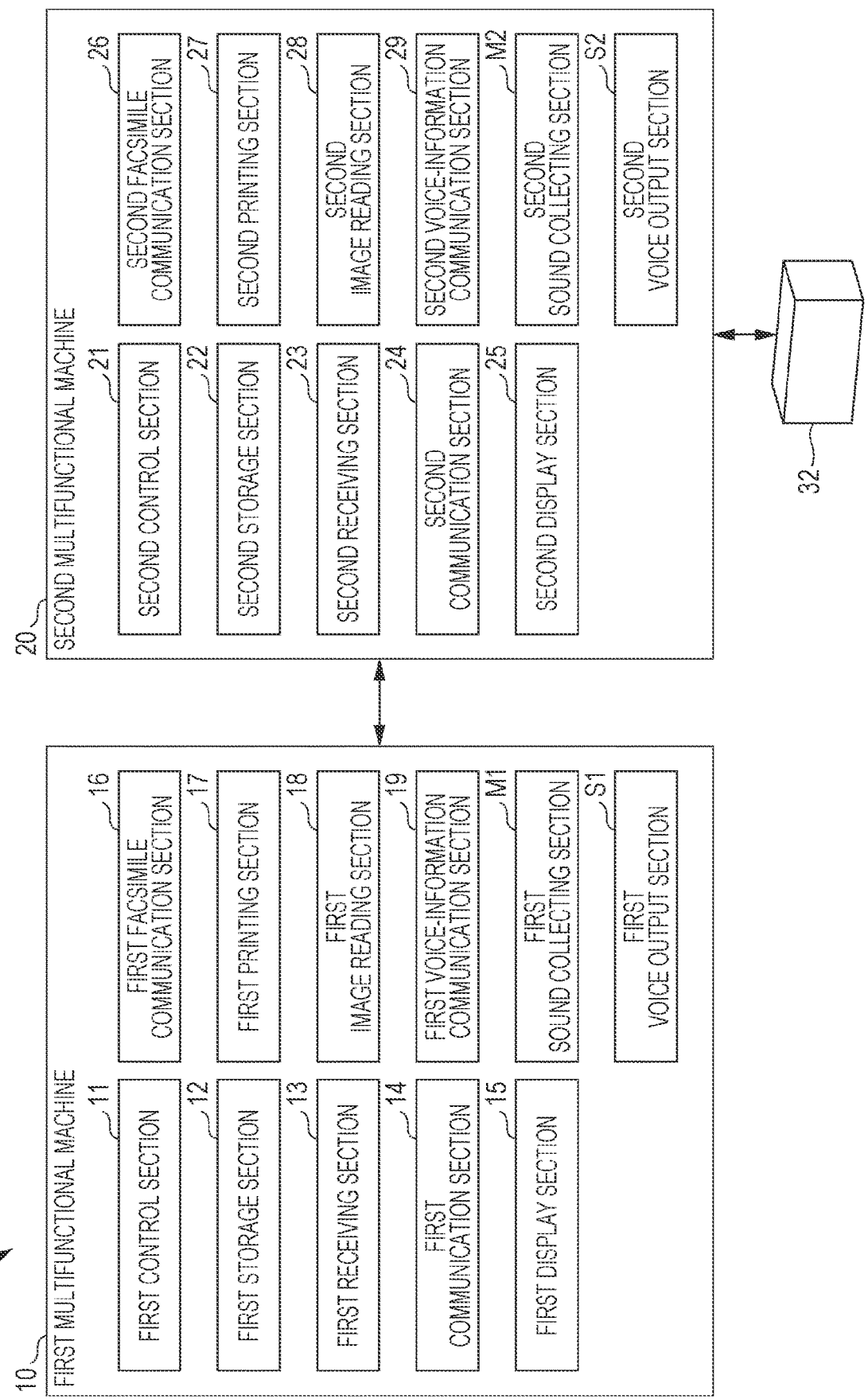
FIG. 14 is a diagram showing an example of the configuration of a communication system according to Modification 2 of the embodiment.

Modification 2 of the embodiment will be described hereinbelow. In a communication system 1 according to Modification 2 of the embodiment, the second control section 21 of the second multifunctional machine 20 does not store the second voice information. In this communication system 1, the second voice information is stored in a second server 32. In other words, the communication system 1 includes the second server 32 that performs the authentication, as shown in FIG. 14. FIG. 14 is a diagram showing an example of the configuration of the communication system 1 according to Modification 2 of the embodiment.

The second server 32 is communicably connected to the second multifunctional machine 20 via wireless or wired communication. The second server 32 is an information processing device, such as a work station, a desktop PC, or a notebook PC. The second server 32 may be another information processing device.

The second server 32 includes a storage section (not shown) that stores the second voice information. Since the configuration of the storage section is the same as the configuration of the second storage section 22, the description thereof will be omitted.

In the communication system 1 according to Modification 2 of the embodiment, the second multifunctional machine 20 does not read the second voice information from the second storage section 22 in the processing of step S205 shown in FIG. 3 but receives the second voice information from the second server 32. This allows the communication system 1 to enhance the confidentiality in transmitting and receiving image information even if the second multifunctional machine 20 does not store the second voice information.

In the communication system 1 according to Modification 2 of the embodiment, the second multifunctional machine 20 does not store the second voice information in the second storage section 22 in the processing of step S405 shown in FIG. 6 but stores the second voice information in the storage section of the second server 32. The allows the communication system 1 to prevent leakage of the second voice information due to hacking of the second multifunctional machine 20.

Modification 3 of Embodiment

Figure 15:
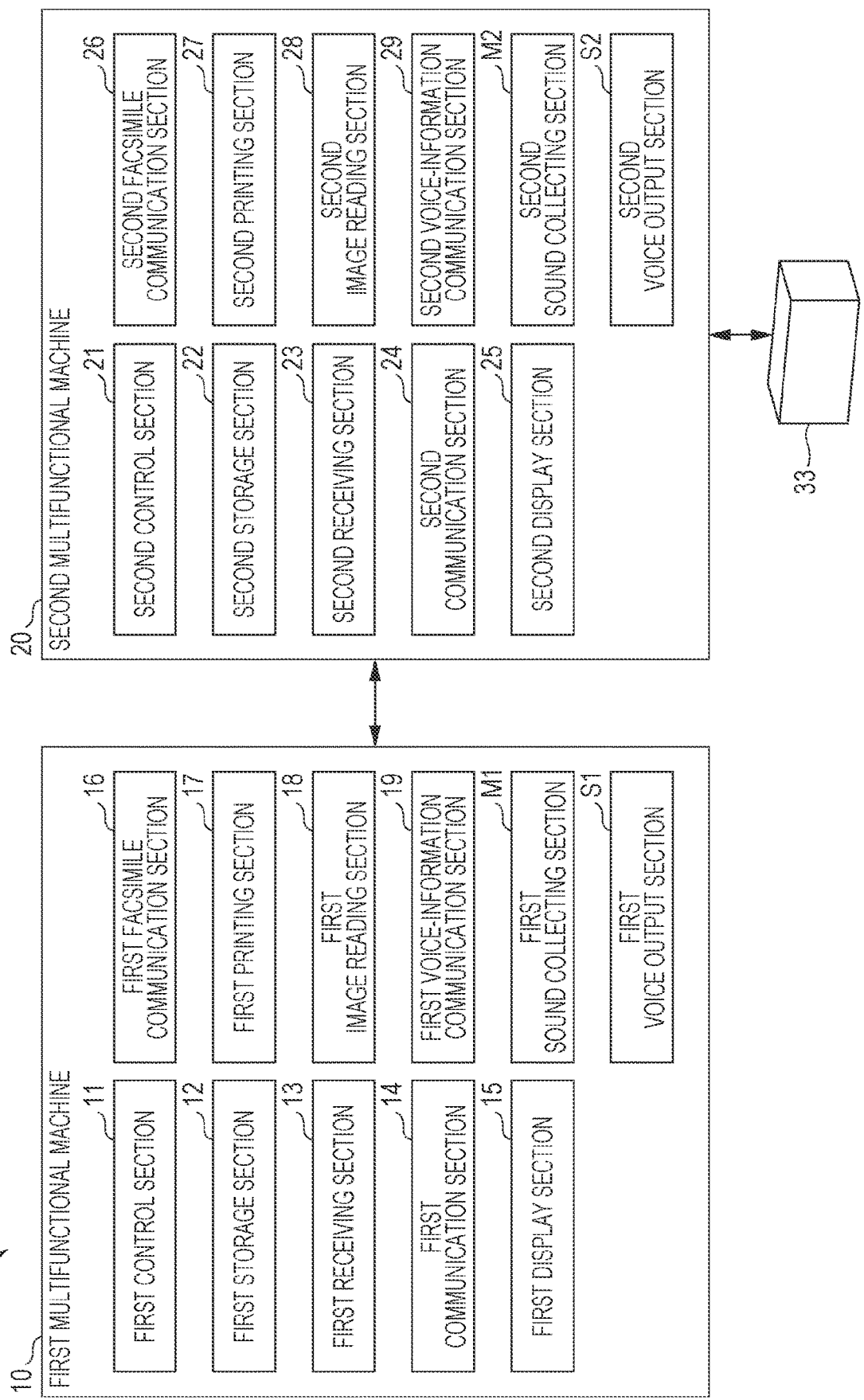
FIG. 15 is a diagram showing an example of the configuration of a communication system according to Modification 3 of the embodiment.

Modification 3 of the embodiment will be described hereinbelow. In a communication system 1 according to Modification 3 of the embodiment, the second control section 21 of the second multifunctional machine 20 does not store the second voice information and does not perform the authentication of the first user based on the first voice information and the second voice information. In this communication system 1, the second voice information is stored in a third server 33. In the communication system 1, the authentication is performed by the third server 33. In other words, the communication system 1 includes the third server 33 that performs the authentication, as shown in FIG. 15. FIG. 15 is a diagram showing an example of the configuration of the communication system 1 according to Modification 3 of the embodiment.

The third server 33 is communicably connected to the second multifunctional machine 20 via wireless or wired communication. The third server 33 is an information processing device, such as a work station, a desktop PC, or a notebook PC. The third server 33 may be another information processing device.

The third server 33 includes a storage section (not shown) that stores the second voice information. Since the configuration of the storage section is the same as the configuration of the second storage section 22, the description thereof will be omitted.

Figure 16:
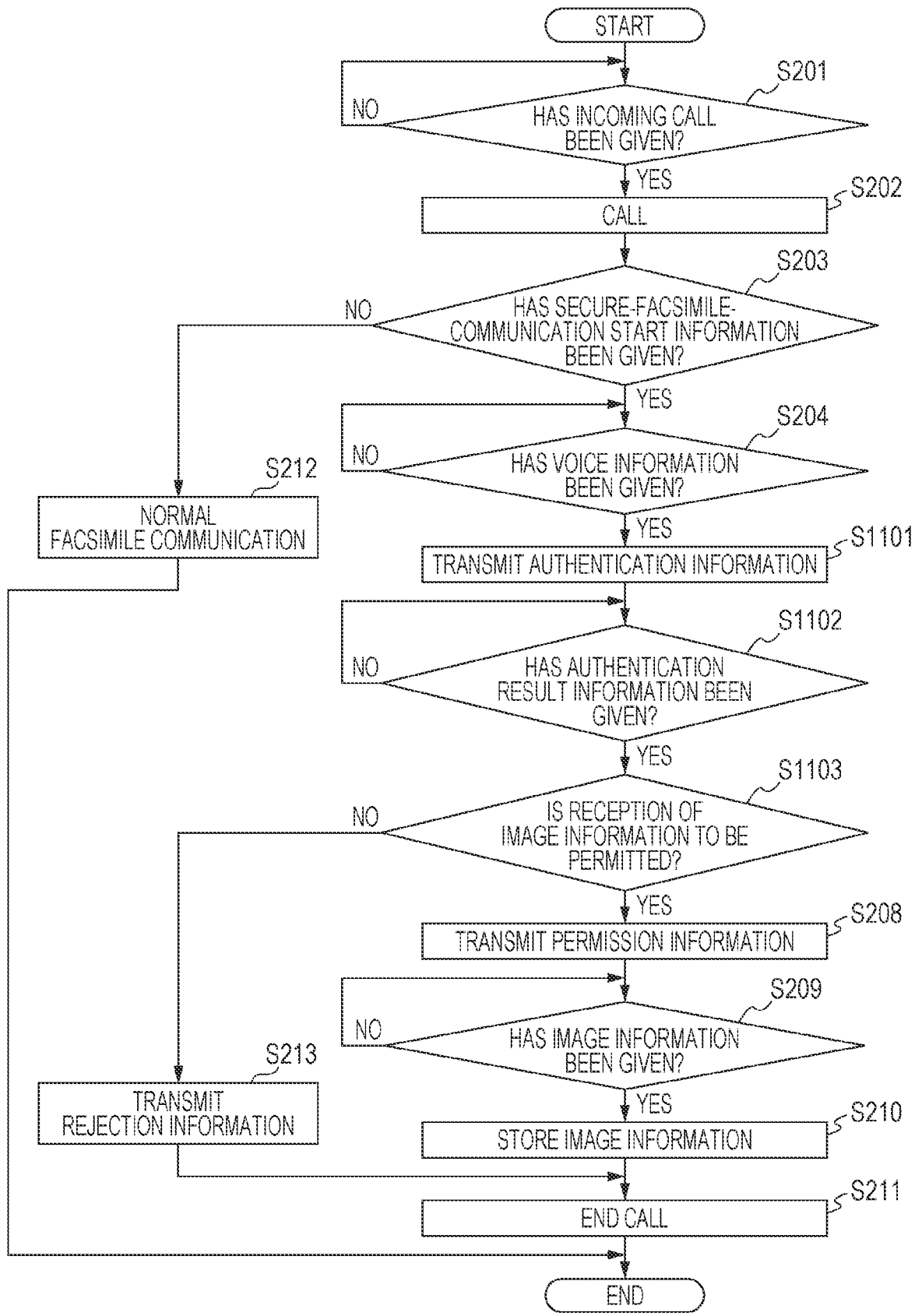
FIG. 16 is a diagram showing still another example of the procedure of the processing in which the second multifunctional machine receives image information from the first multifunctional machine by secure facsimile communication.

In the communication system 1 according to Modification 3 of the embodiment, the second multifunctional machine 20 performs the processing of the flowchart shown in FIG. 16. FIG. 16 is a diagram showing still another example of the procedure of the processing in which the second multifunctional machine 20 receives image information from the first multifunctional machine 10 by secure facsimile communication. In the following example, the second voice-information communication section 29 receives voice information from the first multifunctional machine 10 over telephone lines. In the following example, the second voice information described above is stored in the third storage section 33 before the processing of step S201 shown in FIG. 16 is performed. In the following example, the secure facsimile communication performed between the first multifunctional machine 10 and the second multifunctional machine 20 is combined with confidential communication. Since the processing from step S201 to step S204 shown in FIG. 16 is the same as the processing from step S201 to step S204 shown in FIG. 3, the description thereof will be omitted. Furthermore, since the processing from step S208 to step S213 shown in FIG. 16 is the same as the processing from step S208 to step S213 shown in FIG. 3, the description thereof will be omitted.

After the processing of step S204 shown in FIG. 16 is performed, the second control section 21 transmits information including the first voice information received at step S204 to the third server 33 as authentication information (step S1101). The third server 33 receives the authentication information and performs the same processing as the processing of step S206 shown in FIG. 3 based on the received authentication information and the second voice information stored in a storage section of the third server 33. For this reason, a description of processing in which the third server 33 performs authentication will be omitted.

Next, the second control section 21 waits to receive authentication result information from the third server 33 as a response to the authentication information transmitted at step S1101 (step S1102). The authentication result information is information indicating the result of the authentication performed by the third server 33.

If the second control section 21 determines that authentication result information has been given from the third server 33 (step S1102: YES), then the second control section 21 determines whether to permit reception of the image information from the first multifunctional machine 10 via the second facsimile communication section 26 based on the authentication result information (step S1103). If the result that the authentication result information received at step S1102 indicates is a success, the second control section 21 determines to permit reception of the image information from the first multifunctional machine 10 via the second facsimile communication section 26. In contrast, if the result that the authentication result information received at step S1002 indicates is a failure, the second control section 21 determines to reject reception of the image information from the first multifunctional machine 10 via the second facsimile communication section 26.

If the second control section 21 determines to permit reception of the image information from the first multifunctional machine 10 via the second facsimile communication section 26 (step S1103: YES), the processing moves to step S208 shown in FIG. 16.

In contrast, if the second control section 21 rejects reception of the image information from the first multifunctional machine 10 via the second facsimile communication section 26 (step S1103: NO), the processing goes to step S213 shown in FIG. 16.

Thus, even if the storage of the second voice information and the authentication of the first user based on the first voice information and the second voice information are performed by the first server 31, instead of the second multifunctional machine 20, the communication system 1 according to Modification 3 of the embodiment can enhance the confidentiality in transmitting and receiving image information.

In the communication system 1 according to Modification 3 of the embodiment, the second multifunctional machine 20 does not store the second voice information in the second storage section 22 in the processing of step S405 shown in FIG. 6 but stores the second voice information in the storage section of the third server 33. The allows the communication system 1 to prevent leakage of the second voice information due to hacking of the second multifunctional machine 20.

As described above, a communication system according to an embodiment of the present disclosure is a communication system including a transmitting apparatus and a receiving apparatus that communicates with the transmitting apparatus over a telephone line. The transmitting apparatus includes a first facsimile transmitting section that transmits image information over the telephone line, a first voice-information transmitting section that transmits first voice information that is voice information on a first user, and a first control section that controls the first facsimile transmitting section and the first voice-information transmitting section. The receiving apparatus includes a second facsimile receiving section that receives the image information over the telephone line, a second voice-information communication section that receives the first voice information, and a second control section that controls the second facsimile receiving section and the second voice-information communication section. When the second voice-information communication section receives the first voice information from the transmitting apparatus, the second control section permits or rejects reception of the image information from the transmitting apparatus via the second facsimile receiving section based on a result of authentication of the first user performed based on the received first voice information and second voice information on a user who is permitted in advance to use the receiving apparatus. This allows the communication system 1 to enhance confidentiality in transmitting and receiving image information. In the example described above, the communication system 1 is an example of the communication system. In the example described above, the first multifunctional machine 10 is an example of the transmitting apparatus. In the example described above, the second multifunctional machine 20 is an example of the receiving apparatus. In the example described above, the first facsimile communication section 16 is an example of the first facsimile transmitting section. In the example described above, the first voice-information communication section 19 is an example of the first voice-information transmitting section. In the example described above, the first control section 11 is an example of the first control section. In the example described above, the second facsimile communication section 26 is an example of the second facsimile receiving section. In the example described above, the second voice-information communication section 29 is an example of the second voice-information communication section. In the example described above, the second control section 21 is an example of the second control section.

The communication system may be configured such that the receiving apparatus further includes a second storage section that stores the second voice information, wherein, when the second voice-information communication section receives the first voice information, the second control section reads the second voice information from the second storage section, performs the authentication based on the received first voice information and the read second voice information, and permits or rejects reception of the image information from the transmitting apparatus based on a result of the authentication. In the example described above, the second storage section 22 is an example of the second storage section.

The communication system may further include a first server that performs the authentication. The receiving apparatus may further include a communication section that communicates with the first server. The receiving apparatus may further include a second storage section that stores the second voice information. The communication system may be configured such that the second voice-information communication section receives the first voice information, the second control section reads the second voice information from the second storage section, the communication section transmits the received first voice information and the read second voice information to the first server as authentication information, the first server performs the authentication based on the authentication information received from the receiving apparatus and may transmit authentication result information indicating a result of the authentication to the receiving apparatus, and the second control section permits or rejects reception of the image information from the transmitting apparatus based on the authentication result information received from the first server. In the example described above, the first server 31 is an example of the first server. In the example described above, the second storage section 22 is an example of the second storage section.

The communication system may further include a second server including a second storage section that stores the second voice information. The receiving apparatus may further include a communication section that communicates with the second server. The communication system may be configured such that the receiving apparatus is communicably connected to the second server, the second voice-information communication section receives the first voice information, the communication section receives the second voice information from the second server, and the second control section performs the authentication based on the received first voice information and the received second voice information and may permit or reject reception of the image information from the transmitting apparatus based on a result of the authentication. In the example described above, the second server 32 is an example of the second server. In the example described above, the storage section of the second server 32 is an example of the second storage section.

The communication system may further include a third server that performs the authentication and that includes a second storage section that stores the second voice information. The receiving apparatus may further include a communication section that communicates with the third server. The communication system may be configured such that the second voice-information communication section receives the first voice information, the communication section transmits the received first voice information to the third server, the third server performs the authentication based on the first voice information received from the receiving apparatus and the second voice information stored in the second storage section and transmits authentication result information indicating a result of the authentication to the receiving apparatus, and the second control section permits or rejects reception of the image information from the transmitting apparatus based on the authentication result information received from the third server. In the example described above, the third server 33 is an example of the third server. In the example described above, the storage section of the third server 33 is an example of the second storage section.

The communication system may be configured such that, when the second control section receives a predetermined first operation, the second control section stores voice information received by the second voice-information communication section in the second storage section as the second voice information.

The communication system may be configured such that the first voice information is voice information according to a voice of the first user, in which the second voice information includes voiceprint information indicating a voiceprint of the first user, in which the authentication includes voiceprint authentication based on a voiceprint that the voiceprint information indicates and a voiceprint extracted based on the voice according to the first voice information.

The communication system may be configured such that, in the receiving apparatus, the second voice-information communication section transmits the second voice information according to a voice indicating a predetermined phrase to the transmitting apparatus over the telephone line, in which the authentication further includes phrase authentication based on a phrase that the voice according to the first voice information indicates and the predetermined phrase that the voice according to the second voice information indicates. In the example described above, the second voice-information communication section 29 is an example of the second voice-information communication section.

The communication system may be configured such that, when the second control section receives a predetermined second operation, the second control section transmits voice information according to the voice indicating the predetermined phrase to the transmitting apparatus via the second voice-information communication section, and thereafter stores voice information received from the transmitting apparatus in the second storage section as the second voice information according to the voice indicating the predetermined phrase.

The communication system may be configured such that the second voice information is voice information according to a voice indicating a predetermined phrase, in which the authentication includes phrase authentication based on a phrase that the voice according to the first voice information indicates and the predetermined phrase that the voice according to the second voice information indicates.

The communication system may be configured such that the receiving apparatus further includes a printing section that prints an image that the image information indicates and a third storage section, in which, when the result of the authentication is a success, the second control section permits reception of the image information from the transmitting apparatus, stores the image information received from the transmitting apparatus in the third storage section, and thereafter, when a second user succeeds in logging in the receiving apparatus, causes the printing section to print the image that the image information stored in the third storage section indicates. In the example described above, the second printing section 27 is an example of the printing section. In the example described above, the second storage section 22 is an example of the third storage section.

The communication system may be configured such that the transmitting apparatus further includes a first storage section that stores voice information, in which, when receiving a predetermined third operation, the first control section stores the first voice information in the first storage section, and in which, when transmitting the image information to the receiving apparatus, the first control section reads the first voice information from the first storage section and transmits the read first voice information to the receiving apparatus. In the example described above, the first storage section 12 is an example of the first storage section.

The communication system may be configured such that, when the second control section rejects reception of the image information, the first control section does not transmit the image information.

A receiving apparatus according to an embodiment is a receiving apparatus that communicates with a transmitting apparatus over a telephone line. The receiving apparatus includes a second facsimile receiving section that receives image information over the telephone line, a second voice-information communication section that receives first voice information that is voice information on a first user, and a second control section that controls the second facsimile receiving section and the second voice-information communication section. When the second voice-information communication section receives the first voice information from the transmitting apparatus, the second control section permits or rejects reception of the image information from the transmitting apparatus via the second facsimile receiving section based on a result of authentication of the first user performed based on the received first voice information and second voice information on a user who is permitted in advance to use the receiving apparatus. This allows the receiving apparatus to enhance confidentiality in transmitting and receiving image information.

Having described specific embodiments of the present disclosure with reference to the drawings, it is to be understood that the specific configuration is not limited to the embodiments and that modification, replacement, and deletion may be made without departing from the spirit and scope of the disclosure.

A program for implementing the function of any component of the apparatus described above may be implemented by storing the program in a computer-readable storage medium and reading the program into a computer system. Examples of the apparatus include the first multifunctional machine 10 and the second multifunctional machine 20. The "computer system" here includes hardware, such as an operating system (OS) and peripherals. Examples of "computer-readable storage medium" include storage units, such as movable media including a flexible disk, a magneto-optical disk, a read-only memory (ROM), and a compact disk (CD)-ROM and a hard disk in a computer system. The "computer-readable storage medium" further includes storage media that store a program for a fixed time, such as a volatile memory in a computer system serving as a server or a client when the program is transmitted via a network, such as the Internet, or communication lines, such as telephone lines.

The program may be transmitted from a computer system in which the program is stored in a storage unit to another computer system via a transmission medium or a transmission wave in a transmission medium. The "transmission medium" that transmits the program is a medium having the function of transmitting information, such as a network including the Internet and a communication line including a telephone line.

The program may be a program for implementing part of the function described above. The program may also be a program that implements the above function in combination with a program stored in the computer system, such as a difference file or a difference program.

What is claimed is:

1. A communication system comprising:
   a transmitting apparatus; and
   a receiving apparatus configured to communicate with the transmitting apparatus over a telephone line, wherein
   the transmitting apparatus includes a first central processing unit (CPU) configured to:
     control transmission of image information over the telephone line; and
     control transmission of first voice information that corresponds to a voice of a first user;
   the receiving apparatus includes a second CPU configured to:
     control reception of the image information over the telephone line; and
     control reception of the first voice information,
   when the receiving apparatus receives the first voice information from the transmitting apparatus, the second CPU is further configured to permit or reject reception of the image information from the transmitting apparatus based on a result of authentication of the first user performed based on the received first voice information and second voice information of the first user who is permitted in advance to use the receiving apparatus,
   the second voice information includes voiceprint information indicating a voiceprint of the first user, and
   the authentication includes voiceprint authentication based on the voiceprint that the voiceprint information indicates and a voiceprint extracted based on the voice according to the first voice information.

2. The communication system according to claim 1, wherein
   the receiving apparatus further includes a memory configured to store the second voice information, and
   when the receiving apparatus receives the first voice information, the second CPU is further configured to:
     read the second voice information from the memory;
     perform the authentication based on the received first voice information and the read second voice information; and
     permit or reject the reception of the image information from the transmitting apparatus based on the result of the authentication.

3. The communication system according to claim 1, further comprising a first server configured to perform the authentication, wherein
   the receiving apparatus further includes:
     a communication port configured to communicate with the first server, and
     a memory configured to store the second voice information,
   when the receiving apparatus receives the first voice information, the second CPU is further configured to read the second voice information from the memory, and the communication port is further configured to transmit the received first voice information and the read second voice information to the first server as authentication information,
   the first server is further configured to:
     perform the authentication based on the authentication information received from the receiving apparatus; and
     transmit authentication result information indicating the result of the authentication to the receiving apparatus, and
   permit or reject the reception of the image information from the transmitting apparatus based on the authentication result information received from the first server.

4. The communication system according to claim 1, further comprising a second server including a memory configured to store the second voice information, wherein
   the receiving apparatus further includes a communication port configured to:
     communicate with the second server; and
     receive the second voice information from the second server,
   and
   when the receiving apparatus receives the first voice information, the second CPU is further configured to:
     perform the authentication based on the received first voice information and the received second voice information; and
     permit or reject the reception of the image information from the transmitting apparatus based on the result of the authentication.

5. The communication system according to claim 1, further comprising a third server configured to perform the authentication and includes a memory configured to store the second voice information, wherein
   the receiving apparatus further includes a communication port configured to communicate with the third server,
   the receiving apparatus is further configured to receive the first voice information, and the communication port is configured to transmit the received first voice information to the third server,
   the third server is further configured to:
     perform the authentication based on the first voice information received from the receiving apparatus and the second voice information stored in the memory; and
     transmit authentication result information indicating the result of the authentication to the receiving apparatus, and
   the second CPU is further configured to permit or reject the reception of the image information from the transmitting apparatus based on the authentication result information received from the third server.

6. The communication system according to claim 3, wherein, when the second CPU receives a predetermined first operation, the second CPU is further configured to store the first voice information received by the receiving apparatus in the memory as the second voice information.

7. The communication system according to claim 1, wherein
   in the receiving apparatus, the second CPU is further configured to transmit the second voice information according to a voice indicating a predetermined phrase to the transmitting apparatus over the telephone line, and the authentication further includes phrase authentication based on a phrase that the voice according to the first voice information indicates and the predetermined phrase that the voice according to the second voice information indicates.

8. The communication system according to claim 7, wherein, when the second CPU receives a predetermined second operation, the second CPU is further configured to:
transmit voice information according to the voice indicating the predetermined phrase to the transmitting apparatus; and
store voice information received from the transmitting apparatus in a memory as the second voice information according to the voice indicating the predetermined phrase.

9. The communication system according to claim 1, wherein
the second voice information is voice information according to a voice indicating a predetermined phrase, and
the authentication further includes phrase authentication based on a phrase that the voice according to the first voice information indicates and the predetermined phrase that the voice according to the second voice information indicates.

10. The communication system according to claim 1, wherein
the receiving apparatus further includes a memory and a printing section configured to print an image that the image information indicates,
when the result of the authentication is a success, the second CPU is further configured to:
permit the reception of the image information from the transmitting apparatus; and
store the image information received from the transmitting apparatus in the memory, and
when a second user succeeds in logging in the receiving apparatus, cause the printing section to print the image that the image information stored in the memory.

11. The communication system according to claim 1, wherein
the transmitting apparatus further includes a memory,
when receiving a predetermined third operation, the first CPU is further configured to store the first voice information in the memory, and
when transmitting the image information to the receiving apparatus, the first CPU is further configured to:
read the first voice information from the memory; and
transmit the read first voice information to the receiving apparatus.

12. The communication system according to claim 1, wherein, when the second CPU rejects the reception of the image information, the first CPU does not transmit the image information.

13. A receiving apparatus that communicates with a transmitting apparatus over a telephone line, the receiving apparatus comprising:
a central processing unit (CPU) configured to:
control reception of image information over the telephone line; and
control reception of first voice information that corresponds to a voice of a first user, wherein
when the receiving apparatus receives the first voice information from the transmitting apparatus, the CPU is further configured to permit or reject reception of the image information from the transmitting apparatus based on a result of authentication of the first user performed based on the received first voice information and second voice information of the first user who is permitted in advance to use the receiving apparatus,
the second voice information includes voiceprint information indicating a voiceprint of the first user, and
the authentication includes voiceprint authentication based on the voiceprint that the voiceprint information indicates and a voiceprint extracted based on the voice according to the first voice information.

14. A method for controlling a communication system, the method comprising:
in a transmitting apparatus and a receiving apparatus that communicates with the transmitting apparatus over a telephone line, wherein the transmitting apparatus includes a first central processing unit (CPU) and the receiving apparatus includes a second CPU:
controlling, by the first CPU, transmission of image information over the telephone line;
controlling, by the first CPU, transmission of first voice information that corresponds to a voice of a first user;
controlling, by the second CPU, reception of the image information over the telephone line; and
controlling, by the second CPU, reception of the first voice information, wherein
when the receiving apparatus receives the first voice information from the transmitting apparatus, permitting or rejecting by the second CPU, reception of the image information from the transmitting apparatus based on a result of authentication of the first user performed based on the received first voice information and second voice information of the first user who is permitted in advance to use the receiving apparatus,
the second voice information includes voiceprint information indicating a voiceprint of the first user, and
the authentication includes voiceprint authentication based on the voiceprint that the voiceprint information indicates and a voiceprint extracted based on the voice according to the first voice information.

15. A communication system comprising:
a transmitting apparatus;
a receiving apparatus configured to communicate with the transmitting apparatus over a telephone line, wherein
the transmitting apparatus includes a first central processing unit (CPU) configured to:
control transmission of image information over the telephone line; and
control transmission of first voice information that corresponds to a voice of a first user;
the receiving apparatus includes:
a communication port; and
a second CPU configured to:
control reception of the image information over the telephone line; and
control reception of the first voice information; and
a third server that includes a memory configured to store second voice information of the first user who is permitted in advance to use the receiving apparatus, wherein the receiving apparatus receives the first voice information and transmits the first voice information to the third server via the communication port,
the third server is configured to:
   perform authentication based on the first voice information received from the receiving apparatus and the second voice information stored in the memory; and
   transmit authentication result information indicating a result of the authentication to the receiving apparatus, and
the second CPU is further configured to permit or reject reception of the image information from the transmitting apparatus based on the authentication result information received from the third server.

* * * * *